US009979964B2

(12) United States Patent
Shibahara et al.

(10) Patent No.: US 9,979,964 B2
(45) Date of Patent: May 22, 2018

(54) IMAGE PROCESSING METHOD AND IMAGE PROCESSING APPARATUS

(71) Applicant: Panasonic Corporation, Osaka (JP)

(72) Inventors: Youji Shibahara, Osaka (JP); Takahiro Nishi, Nara (JP)

(73) Assignee: SUN PATENT TRUST, New York, NY (US)

( * ) Notice: Subject to any disclaimer, the term of this patent is extended or adjusted under 35 U.S.C. 154(b) by 938 days.

(21) Appl. No.: 14/266,917

(22) Filed: May 1, 2014

(65) Prior Publication Data

US 2014/0334546 A1     Nov. 13, 2014

(30) Foreign Application Priority Data

May 9, 2013   (JP) ................................ 2013-099001
May 9, 2013   (JP) ................................ 2013-099002

(51) Int. Cl.
| | |
|---|---|
| *H04N 19/105* | (2014.01) |
| *H04N 19/50* | (2014.01) |
| *H04N 19/573* | (2014.01) |
| *H04N 19/12* | (2014.01) |
| *H04N 19/107* | (2014.01) |
| *H04N 19/159* | (2014.01) |
| *H04N 19/70* | (2014.01) |

(Continued)

(52) U.S. Cl.
CPC ......... *H04N 19/107* (2014.11); *H04N 19/159* (2014.11); *H04N 19/172* (2014.11); *H04N 19/31* (2014.11); *H04N 19/70* (2014.11)

(58) Field of Classification Search
CPC .... H04N 19/107; H04N 19/159; H04N 19/70; H04N 19/31; H04N 19/172
See application file for complete search history.

(56) References Cited

U.S. PATENT DOCUMENTS

2006/0062302 A1*   3/2006   Yin ...................... H04N 19/176
                                                               375/240.16
2007/0201549 A1*   8/2007   Hannuksela ... H04N 21/234327
                                                               375/240.01

(Continued)

FOREIGN PATENT DOCUMENTS

| JP | 2011-023772 | 2/2011 |
|---|---|---|
| WO | WO 2012/124347 A1 * | 9/2012 |

OTHER PUBLICATIONS

"Information technology—Coding of audio-visual objects—Part10: Advanced Video Coding", International Standard, ISO/IEC 14496-10, Second Edition, Oct. 1, 2004, pp. 1-267.

(Continued)

*Primary Examiner* — Sath V Perungavoor
*Assistant Examiner* — Philip Dang
(74) *Attorney, Agent, or Firm* — Wenderoth, Lind & Ponack, L.L.P.

(57) ABSTRACT

An image processing method with which occurrence of an error is suppressed is an image processing method for processing an image signal generated by encoding a plurality of pictures. The method includes: obtaining, from the image signal, a parameter indicating restriction on a reference relation between at least one of the plurality of pictures and an other one of the plurality of pictures in the encoding; and performing restriction alleviation processing for alleviating the restriction on the reference relation indicated by the parameter.

7 Claims, 39 Drawing Sheets

(51) Int. Cl.
*H04N 19/172* (2014.01)
*H04N 19/31* (2014.01)

(56) References Cited

U.S. PATENT DOCUMENTS

| | | | | |
|---|---|---|---|---|
| 2007/0217503 A1* | 9/2007 | Haskell | H04N 21/234327 | 375/240.1 |
| 2007/0230564 A1* | 10/2007 | Chen | H04N 21/234327 | 375/240.01 |
| 2010/0002761 A1* | 1/2010 | Pandit | H04N 19/597 | 375/240.01 |
| 2011/0064146 A1* | 3/2011 | Chen | H04N 21/234327 | 375/240.26 |
| 2012/0183079 A1* | 7/2012 | Yoshimatsu | H04N 19/44 | 375/240.25 |
| 2012/0229602 A1* | 9/2012 | Chen | H04N 19/597 | 348/43 |
| 2013/0034170 A1* | 2/2013 | Chen | H04N 13/00 | 375/240.25 |
| 2013/0077677 A1* | 3/2013 | Wang | H04N 19/105 | 375/240.12 |
| 2013/0077678 A1* | 3/2013 | Chen | H04N 19/105 | 375/240.12 |
| 2013/0077679 A1* | 3/2013 | Wang | H04N 19/105 | 375/240.12 |
| 2013/0077680 A1* | 3/2013 | Wang | H04N 19/105 | 375/240.12 |
| 2013/0077681 A1* | 3/2013 | Chen | H04N 19/105 | 375/240.12 |
| 2013/0077685 A1* | 3/2013 | Chen | H04N 19/105 | 375/240.14 |
| 2013/0077687 A1* | 3/2013 | Wang | H04N 19/105 | 375/240.15 |
| 2013/0089135 A1* | 4/2013 | Chen | H04N 19/70 | 375/240.02 |
| 2013/0107942 A1* | 5/2013 | Chen | H04N 19/70 | 375/240.03 |
| 2013/0107953 A1* | 5/2013 | Chen | H04N 19/70 | 375/240.12 |
| 2014/0092953 A1* | 4/2014 | Deshpande | H04N 19/31 | 375/240.01 |
| 2014/0169446 A1* | 6/2014 | Yang | H04N 19/172 | 375/240.02 |
| 2014/0301451 A1* | 10/2014 | Deshpande | H04N 19/597 | 375/240.12 |

OTHER PUBLICATIONS

Benjamin Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, JCTVC-L1003_v34, pp. 1-298.

Gerhard Tech et al.,"MV-HEVC Draft Text 3 (ISO/IEC 23008-2:201x/PDAM2)", Joint Collaborative Team on 3D Video Coding Extension Development of ITU-T SG 16 WP 3 and ISO/IEC JTC 1/SC 29/WG 11 3rd Meeting: Geneva, CH, Jan. 17-23, 2013.

\* cited by examiner

FIG. 5

| NAL unit type | NAL unit type name | Details |
|---|---|---|
| 16 | BLA_W_LP | BLA Picture (LP Allow) |
| 17 | BLA_W_RADL | BLA Picture (RADL Allow, RASL Not-allow) |
| 18 | BLA_N_LP | BLA Picture (LP Not-allow) |
| 19 | IDR_W_RADL | IDR Picture (RADL Allow, RASL Not-allow) |
| 20 | IDR_N_LP | IDR Picture (LP Not-allow) |
| 21 | CRA_NUT | CRA Picture (LP Allow) |
| 6, 7 | RADL | RADL Picture |
| 8, 9 | RASL | RASL Picture |

FIG. 11

| NAL unit type | NAL unit type name | Details |
|---|---|---|
| 2, 3 | TSA | TSA Picture |
| 4, 5 | STSA | STSA Picture |
| 6, 7 | RADL | RADL Picture |
| 8, 9 | RASL | RASL Picture |

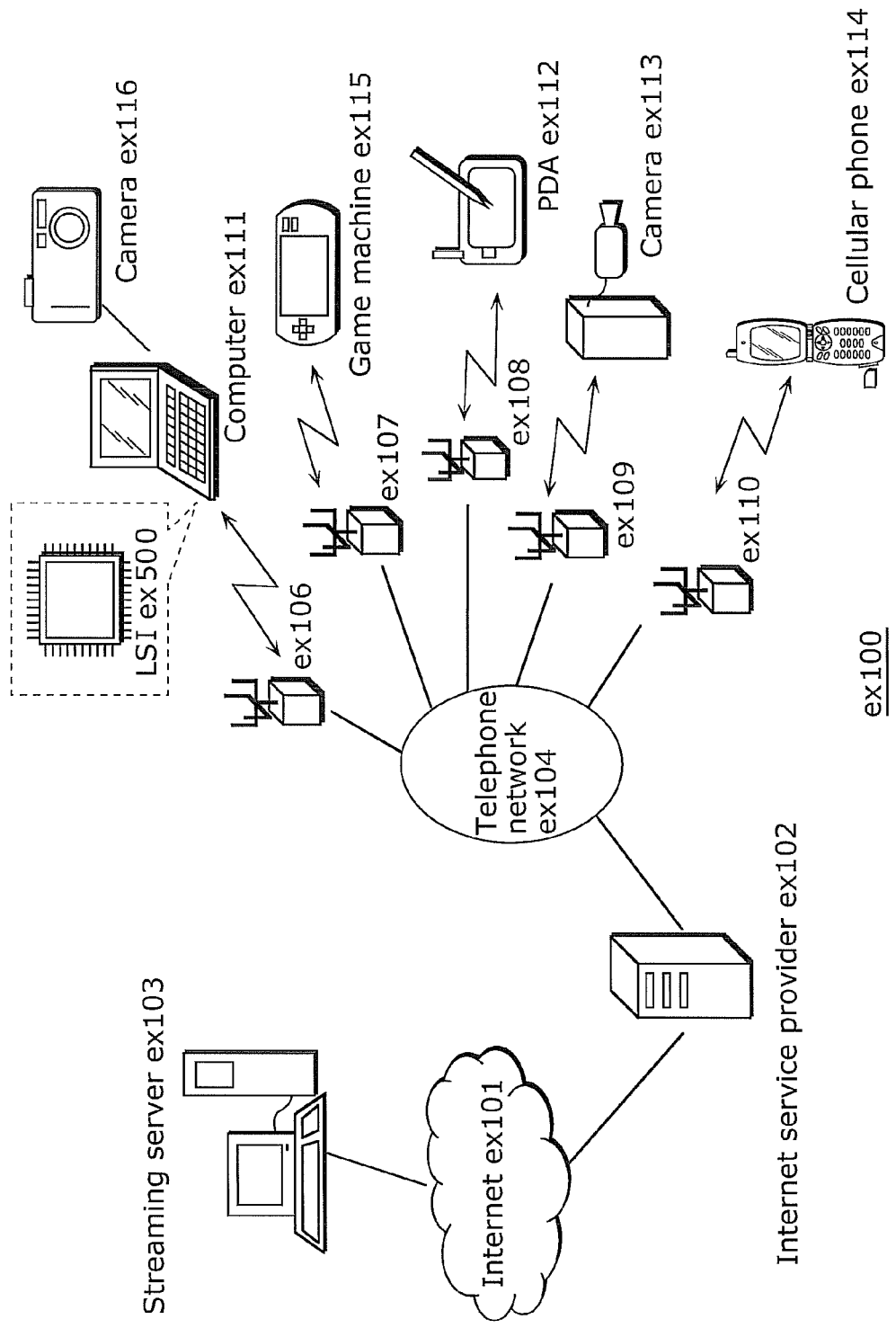

FIG. 26

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 29
Stream of TS packets
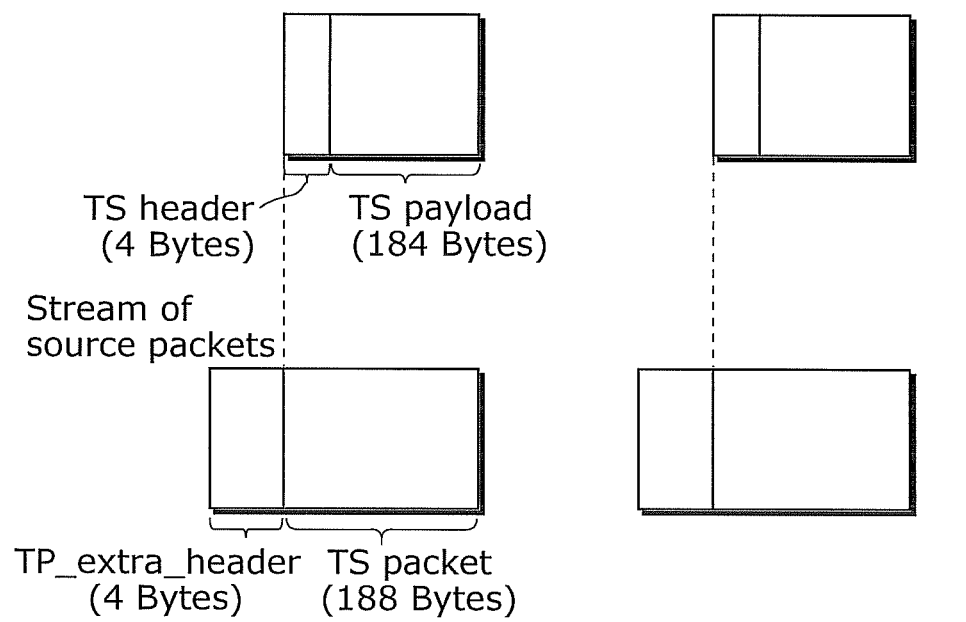
TS header (4 Bytes)   TS payload (184 Bytes)
Stream of source packets
TP_extra_header (4 Bytes)   TS packet (188 Bytes)
Multiplexed data
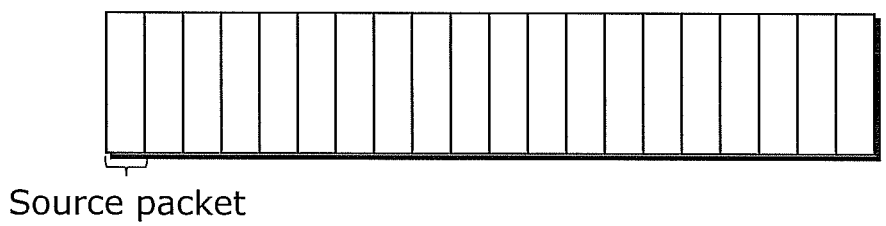
SPN 0 1 2 3 4 5 6 7 ...
Source packet Data structure of PMT

FIG. 37

| Corresponding standard | Driving frequency |
|---|---|
| MPEG-4 AVC | 500 MHz |
| MPEG-2 | 350 MHz |
| ⋮ | ⋮ |

IMAGE PROCESSING METHOD AND IMAGE PROCESSING APPARATUS

CROSS REFERENCE TO RELATED APPLICATION

The present application claims the benefit of Japanese Patent Application No. 2013-099001 filed on May 9, 2013 and Japanese Patent Application No. 2013-099002 filed on May 9, 2013. The entire disclosures of the above-identified applications, including the specifications, drawings and claims are incorporated herein by reference in there entirety.

FIELD

The present disclosure relates to an image processing method and an image processing apparatus for processing an image signal.

BACKGROUND

In order to compress audio data and video data, the audio coding standards and the video coding standards have been developed. The examples of the video coding standards include the ITU-T standards denoted as H. 26x, and the ISO/IEC standards denoted as MPEG-x (see Non Patent Literature 1, for example). The latest video coding standard is the standard denoted as H.264/MPEG-4AVC. In addition, a next-generation coding standard denoted as High Efficiency Video Coding (HEVC) has been under consideration in recent years (see Non Patent Literature 2).

CITATION LIST

Non Patent Literature

Non Patent Literature 1

ISO/IEC 14496-10 "MPEG-4 Part 10 Advanced Video Coding"

Non Patent Literature 2

Joint Collaborative Team on Video Coding (JCT-VC) of ITU-T SG16 WP3 and ISO/IEC JTC1/SC29/WG11 12th Meeting: Geneva, SW, -1-10 Jan. 2013, JCTVC-L1003, "High Efficiency Video Coding (HEVC) text specification draft10", http://phenix.int-evry.fr/jct/doc_end_user/documents/12_Geneva/wg11/JCTVC-L1003-v34.zip

SUMMARY

Technical Problem

However, the image processing methods of the above-described NPL 1 and NPL 2 pose a problem that they are prone to an error.

In view of the above, one non-limiting and exemplary embodiment provides an image processing method with which occurrence of an error is suppressed.

Solution to Problem

An image processing method according to an aspect of the present disclosure is an image processing method for processing an image signal generated by encoding a plurality of pictures, the image processing method including: obtaining a parameter from the image signal, the parameter indicating restriction on a reference relation between at least one of the plurality of pictures and an other one of the plurality of pictures in the encoding; and performing restriction alleviation processing for alleviating the restriction on the reference relation indicated by the parameter.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

An image processing method disclosed herein enables suppressing occurrence of an error.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 is a diagram which illustrates NAL unit types related to the RAP picture and the leading picture.

FIG. 11 is a diagram which illustrates the NAL unit types used in Embodiment 3.

FIG. 20 shows an overall configuration of a content providing system for implementing content distribution services.

FIG. 26 illustrates a structure of multiplexed data.

FIG. 29 shows a structure of TS packets and source packets in the multiplexed data.

FIG. 37 shows an example of a look-up table in which video data standards are associated with driving frequencies.

DESCRIPTION OF EMBODIMENTS (Underlying Knowledge Forming Basis of the Present Disclosure)

An image signal encoded using the coding technique of HEVC includes a higher level unit for storing a video frame (picture) called a network abstraction layer (NAL) unit.

With an apparatus or system in which an image signal is provided, it is possible, by only decoding header information of a NAL unit, to broadly classify video frames which are targets for processing, without decoding a video core layer (slice layer or macroblock layer). For that reason, the header information of a NAL unit is mainly used by an application of a system layer which lacks sufficient capacity for encoding and/or decoding the video core layer. The header information of a NAL unit includes a NAL unit type and a time hierarchy ID (TID), and the video core layer includes information indicating a reference relation.

However, the reference relation indicated by the header information of the NAL unit contradicts an actual reference relation in the video core layer in some cases. In such a case, there is a problem that an operation of the system layer and a decoding operation of the video core layer cannot be carried out.

First, the configuration of pictures included in video will be described in detail in order to show that the above-described problem occurs.

The demand is high for reproducing recorded content (bit stream) from a position in midstream, which is generally called as random access reproduction. For that reason, a random access point for enabling the random access reproduction is set in a bit stream (the above-described image signal) obtained as a result of encoding video.

A random access point is a point which is a starting point when reproducing a bit stream from a position in midstream. A picture to be the random access point is called a random access point (RAP) picture. When video is encoded using a time correlation between pictures as in MPEG-x, a bit stream obtained as a result of encoding the video cannot be decoded from an arbitrary position. However, since the RAP picture is encoded independently of other pictures, it is possible to start decoding from the RAP picture. The RAP picture needs to be encoded independently of other pictures, and thus inter frame (inter picture) prediction encoding is not carried out. Only intra frame (intra picture) prediction encoding is performed on the RAP picture, and the RAP picture becomes an intra picture (I picture).

Figure 1:
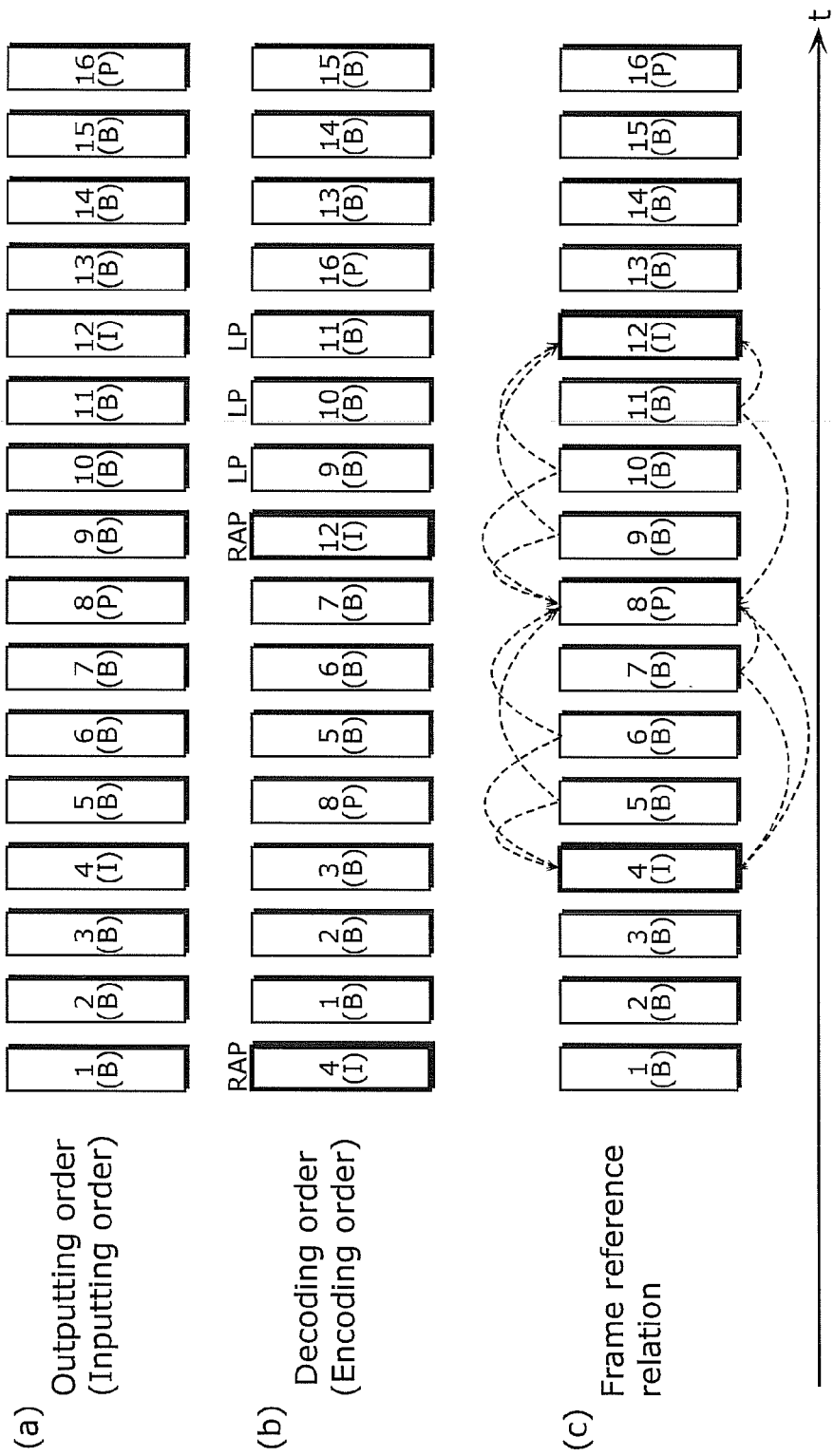
FIG. 1 is a diagram which illustrates a relation between a random access point (RAP) picture and a leading picture.

FIG. 1 is a diagram which illustrates a relation between a random access point (RAP) picture and a leading picture. A detailed description as to the leading picture will be provided below. It is to be noted that, in FIG. 1, a rectangle frame indicates a picture, a numerical character in the frame indicates a picture number that will be described later, and a bracketed alphabet in the frame indicates a picture type (I-picture, P-picture, or B-picture).

In FIG. 1, (a) illustrates an outputting order (display order) of uncompressed pictures which are decoded, or an inputting order of input pictures to be encoded. The pictures are assigned numbers (picture numbers), and pictures from picture 1 to picture 16 are illustrated as examples of the picture numbers. It is to be noted that the picture numbers indicate temporally preceding-following relations of input or output.

In FIG. 1, (b) illustrates a decoding order of encoded pictures or an encoding order of inputted pictures. More specifically, pictures are encoded or decoded in the order of picture numbers 4, 1, 2, 3, 8, 5, . . . . In other words, pictures are not encoded in the inputting order illustrated in (a) in FIG. 1, but pictures are encoded with the order being changed as illustrated in (b) in FIG. 1. Alternatively, pictures are decoded not in the outputting (display) order illustrated in (a) in FIG. 1 but in the order as illustrated in (b) in FIG. 1. Accordingly, for example, the picture 4 previously decoded is held in a buffer (decoded picture buffer (DPB)) until the time to output (display) the picture 4 after the pictures 1, 2, and 3 are outputted (displayed).

In FIG. 1, (c) illustrates a frame reference relation used in inter frame prediction encoding. A frame reference relation of pictures from the picture 4 which is a RAP picture to the picture 12 which is the next RAP picture is illustrated as an example. The dotted arrow lines each illustrate the reference between frames, indicating that a picture at the starting point of an arrow uses a picture at the ending point of the arrow as a reference picture in prediction encoding. For example, the pictures 5, 6, and 7 which are B-pictures each refer to the picture 4 and the picture 8. The picture 8 which is a P-picture refers to the picture 4. In addition, the pictures 9, 10, and 11 which are B-pictures each refer to the picture 8 and the picture 12. It is to be noted that the pictures 4 and 12 which are I-pictures do not refer to other pictures.

A picture to be referred to needs to be encoded prior to a picture which refers in video encoding, and a picture to be referred to needs to be decoded prior to a picture which refers in video decoding. Thus, when the prediction structure (frame reference relation) illustrated in (c) in FIG. 1 is used for the inputting order illustrated in (a) in FIG. 1, encoding or decoding is performed in encoding (decoding) order illustrated in (b) in FIG. 1. More specifically, after the picture 4 which is the RAP picture is encoded, the picture 8 is encoded with referenced to the picture 4, and the pictures 5, 6, and 7 are encoded in order with referenced to the pictures 4 and 8. Subsequently, the picture 12 which is the RAP picture is encoded, and the pictures 9, 10, and 11 are encoded in order with referenced to the pictures 8 and 12. Much the same is true on decoding. After the picture 4 which is the RAP picture is decoded, the picture 8 is decoded with referenced to the picture 4, and the pictures 5, 6, and 7 are decoded in order with referenced to the pictures 4 and 8. Subsequently, the picture 12 which is the RAP picture is decoded, and the pictures 9, 10, and 11 are decoded in order with referenced to the pictures 8 and 12.

The following describes a leading picture which is introduced in high efficiency video coding (hereinafter referred to as an HEVC scheme) which is a video coding method that is under way of standardization. A leading picture is a picture which is subsequent to the RAP picture in decoding order and precedes the RAP picture in outputting order (display order). In the examples illustrated in (a) and (b) in FIG. 1, the pictures 9, 10, and 11 are subsequent, in decoding order, to the picture 12 which is the RAP picture. In addition, the pictures 9, 10, and 11 precede, in outputting order, the picture 12 which is the RAP picture. In other words, the pictures 9, 10, and 11 are leading pictures (LP) with respect to the picture 12 which is the RAP picture.

In the HEVC scheme, three types of pictures, an instantaneous decoding refresh picture (IDR picture), a broken link access picture (BLA picture), and a clean random access picture (CRA picture), are defined, for the RAP picture.

Figure 2:
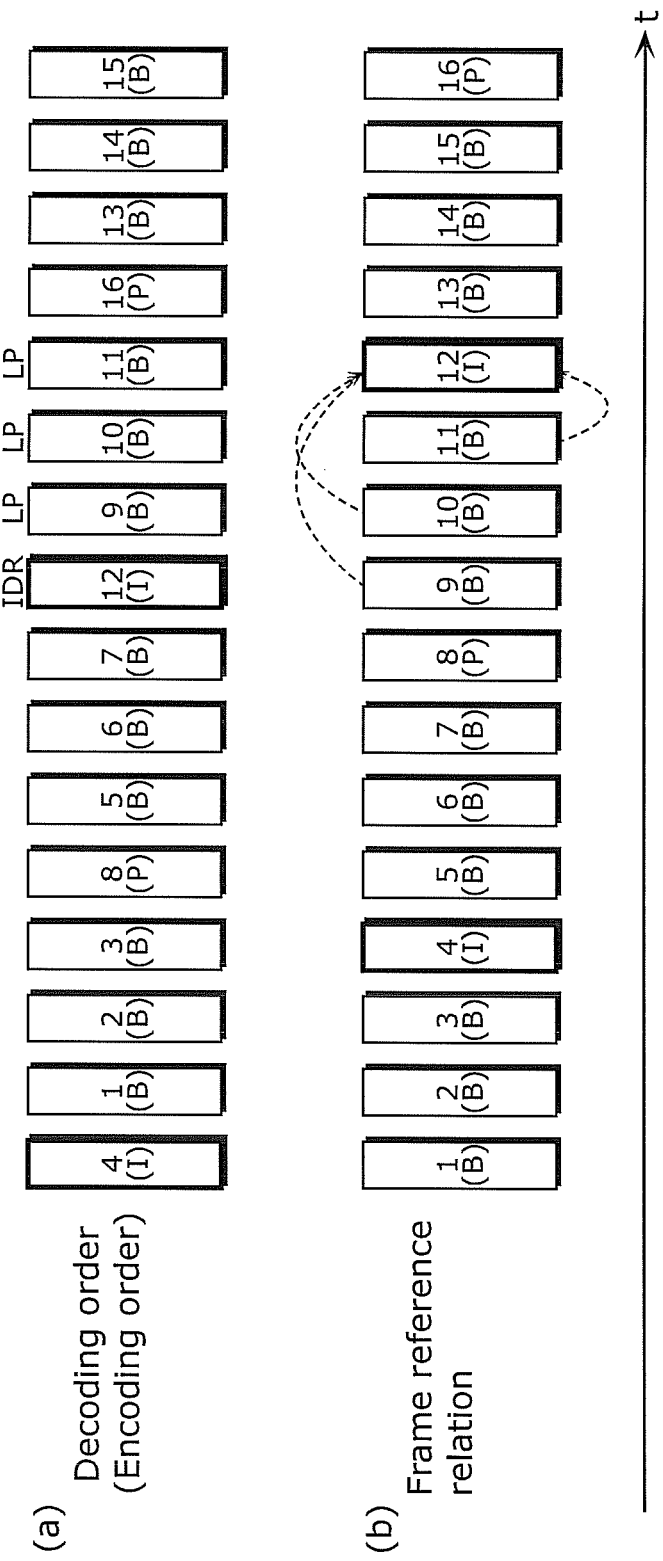
FIG. 2 is a diagram for explaining the leading picture when the RAP picture is an IDR picture.

FIG. 2 is a diagram for explaining the leading picture when the RAP picture is the IDR picture. According to this case, the outputting order of decoded pictures or inputting order of pictures to be encoded is the same as the order illustrated in (a) in FIG. 1. It is to be noted that, in FIG. 2, a rectangle frame indicates a picture, a numerical character in the frame indicates a picture number, and an alphabet indicates a picture type, in the same manner as FIG. 1.

In FIG. 2, (a) indicates a decoding order of encoded pictures, as with (b) in FIG. 1. However, (a) in FIG. 2 is different from (b) in FIG. 1 in that the picture 12 is the IDR picture.

In FIG. 2, (b) illustrates a frame reference relation of a leading picture with respect to the IDR picture, which is used in the inter frame prediction. A frame reference relation of the pictures 9, 10, and 11 which are the leading pictures with respect to the picture 12 which is the IDR picture is illustrated as an example. The pictures 9, 10, and 11 which are the leading pictures each refer to only the picture 12. It is forbidden for a picture that is subsequent to an IDR picture in decoding order to refer to a picture which is previous to (preceding) the IDR picture in decoding order. For example, the pictures 9, 10, and 11 cannot refer to the picture 8 or the like which is previous to the picture 12 in decoding order.

In other words, a leading picture of an IDR picture cannot refer to a picture previous to the IDR picture in decoding order. It is to be noted that, in the case of the RAP picture other than the IDR picture; that is, the CRA picture and the BLA picture, it is not forbidden for the leading picture with respect to the RAP picture to refer to a picture which is previous to the RAP picture in decoding order.

The following describes the BLA picture. The BLA picture is a picture which is generated when recorded content is edited, for example. More specifically, when video is edited such that recorded content 1 is divided into A, B, and C, B is deleted, and A and C are combined, the RAP picture at the top of C becomes the BLA picture. It is to be noted that when the content 1 is divided into A, B, and C, the content 1 is divided at the position of the RAP picture. In addition, as another example, when record content 1 and record content 2 are combined, the RAP picture at the top of the recorded content 2 can be the BLA picture.

Figure 3:
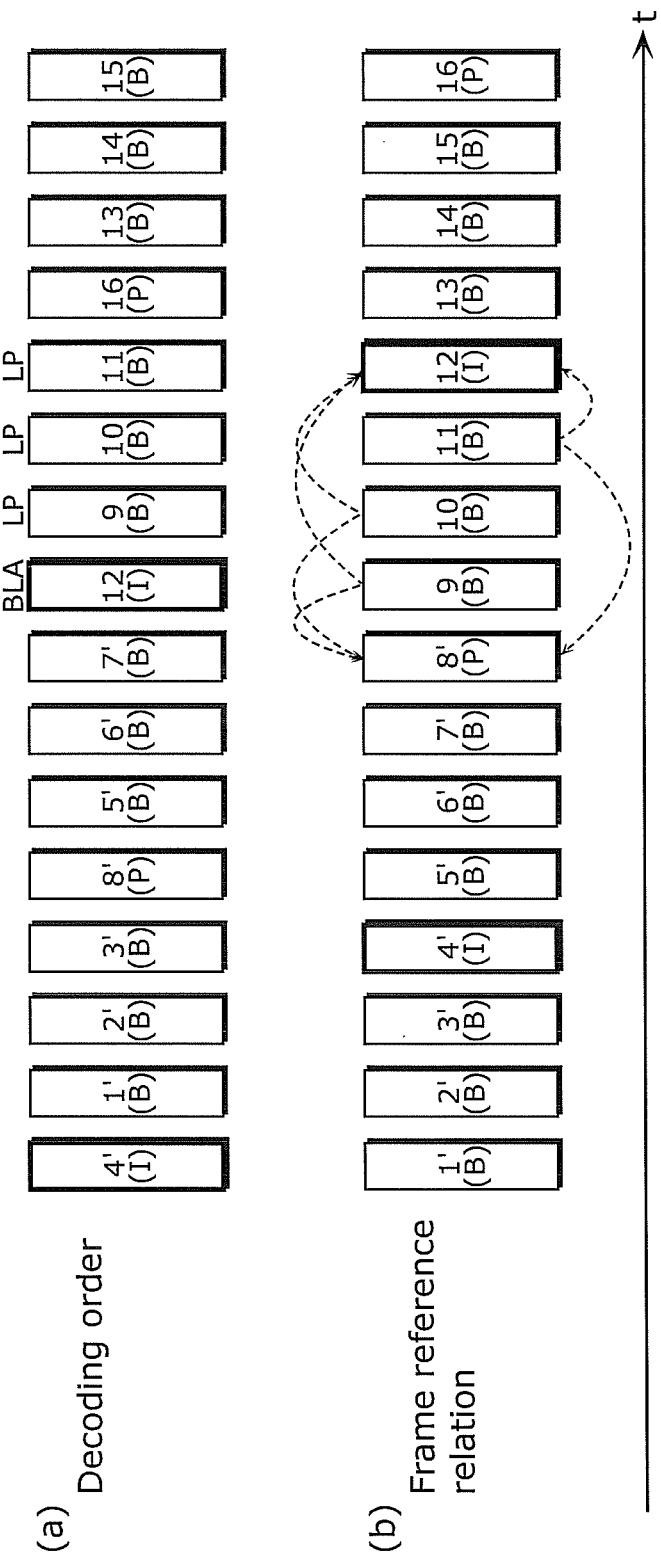
FIG. 3 is a diagram for explaining the leading picture when the RAP picture is a BLA picture.

FIG. 3 is a diagram for explaining the leading picture when the RAP picture is the BLA picture. According to this case, the outputting order of decoded pictures or the inputting order of pictures to be encoded is the same as the order illustrated in (a) in FIG. 1. It is to be noted that, also in FIG. 3, a rectangle frame indicates a picture, a numerical character in the frame indicates a picture number, and an alphabet indicates a picture type, in the same manner as FIG. 1.

In FIG. 3, (a) indicates a decoding order of encoded pictures, as with (b) in FIG. 1. However, (a) in FIG. 3 is different from (b) in FIG. 1 in that the picture 12 is the BLA picture. In addition, as described above, the bit stream from the picture 1' to the picture 8' and the bit stream from the picture 9 to the picture 16 lack continuity, correspond, for example, to A in the content 1 and C in the content 1, and simply combined by editing. In this point, too, (a) in FIG. 3 is different from (b) in FIG. 1.

In FIG. 3, (b) illustrates a frame reference relation of the leading pictures with respect to the BLA picture, which is used in the inter frame prediction. A frame reference relation of the pictures 9, 10, and 11 which are the leading pictures with respect to the picture 12 which is the BLA picture is illustrated as an example. As illustrated in (b) in FIG. 3, the leading pictures 9, 10, and 11 with respect to the picture 12 refer to the picture 8' and the picture 12. At this time, decoding is formally possible using the picture 8' and the picture 12; however, the picture 8' is a picture having no relation, for example, to the pictures 9, 10, and 11 which are combined by editing. In other words, since the picture 8' is not a proper reference picture for the pictures 9, 10, and 11, it is not possible to obtain a proper decoded image. It can be said that the reference structure of the leading pictures 9, 10, and 11 is broken (broken link).

It is to be noted that the CRA picture is a RAP picture other than the IDR picture and the BLA picture. In the case of the CRA picture, since the leading picture with respect to the CRA picture can refer to a picture which is previous to the CRA picture in decoding order, the coding efficiency is greater than the case of the IDR picture. In addition, since the reference structure is not broken unlike the leading picture of the BLA picture, it is possible to decode all the leading pictures at the time of normal reproduction.

Classification of the RAP picture has been described above, and the following describes classification of the leading picture.

Two types of leading pictures are defined; that is, a random access decodable leading (RADL) picture and a random access skipped leading (RASL) picture. When jumping into (random accessing) a RAP picture and decoding from the RAP picture (at the time of random access reproduction), the RADL picture is a decodable leading picture. On the other hand, the RASL picture is a leading picture which cannot be decoded at the time of random access reproduction.

Figure 4:
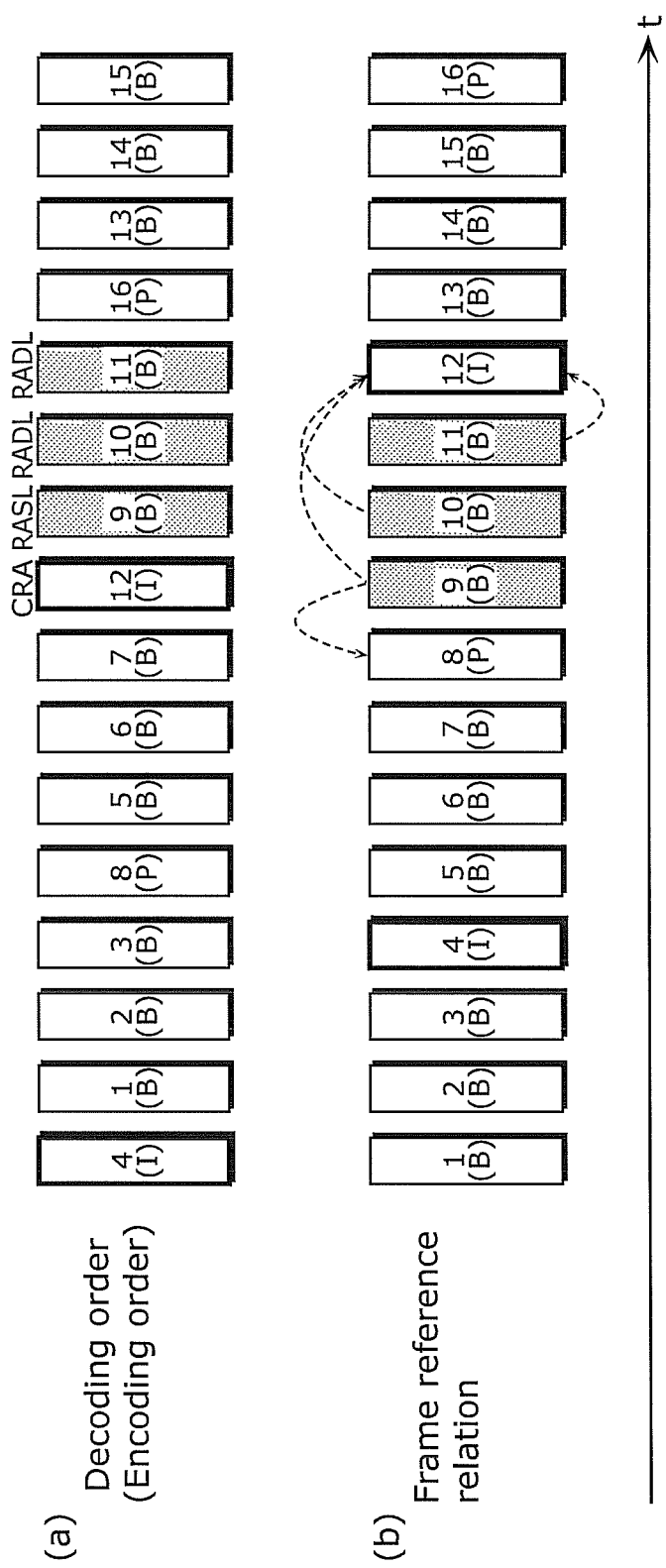
FIG. 4 is a diagram for explaining classification of the leading picture.

FIG. 4 is a diagram for explaining classification of the leading picture. According to this case, the outputting order of decoded pictures or the inputting order of pictures to be encoded is the same as the order illustrated in (a) in FIG. 1. It is to be noted that, in FIG. 4, a rectangle frame indicates a picture, a numerical character in the frame indicates a picture number, and an alphabet indicates a picture type, in the same manner as FIG. 1. In FIG. 4, (a) indicates a decoding order of encoded pictures, as with (b) in FIG. 1. However, (a) in FIG. 4 is different from (b) in FIG. 1 in that the picture 12 is a CRA picture, and the leading pictures 9, 10, and 11 are subdivided into a RASL picture and RADL pictures.

In FIG. 4, (b) illustrates an example of a reference picture of the leading pictures 9, 10, and 11 with respect to the CRA picture. The picture 9 refers to the picture 8 and the picture 12. As a result, the picture 8 cannot be used as a reference picture when decoding is started from the picture 12 (at the time of random accessing to the picture 12), and thus the picture 9 cannot be decoded. Thus, the picture 9 becomes a RASL picture. On the other hand, the pictures 10 and 11 refer only to the picture 12. As a result, the picture 12 can be used as a reference picture when decoding is started from the picture 12, and thus it is possible to decode the pictures 10 and 11. Thus, the pictures 10 and 11 become RADL pictures.

As described above, the leading picture of the IDR picture cannot refer to a picture previous to the IDR picture in decoding order. Thus, the leading picture of the IDR picture always becomes the RADL picture. Alternatively, there is no leading picture with respect to the IDR picture in some cases. The leading picture of the CRA picture and the BLA picture includes only the RADL picture, only the RASL picture, or a mix of the RASL picture and the RADL picture or neither of them in some cases.

In other words, which type (RADL picture or RASL picture) of leading picture is present differs according to the type of RAP picture. Furthermore, there is the case where there is no leading picture. When a RAP picture is decoded, it is beneficial for the decoding processing if information of a type of leading picture with respect to the RAP picture, or information indicating that there is no leading picture with respect to the RAP picture, is obtained.

In view of the above, a NAL unit type is described in a NAL unit header (the above-described header information) of a network abstraction layer (NAL) unit. The NAL unit is a unit for sectioning encoded data, and includes two-byte (fixed length) NAL unit header and payload. The NAL unit header includes a NAL unit type which is an identifier indicating a type of the NAL unit. The payload includes raw byte sequence payload (RBSP) which is encoded data. In order to perform byte alignment on the RBSP (multiple of 8 bits), trailing bit of 1 to 8 bits is added at the end of RBSP.

By referring to the NAL unit type, it is possible to identify the type of data included in the payload of the NAL unit. In addition, the NAL unit can include not only video data but also an encoded parameter such as a sequence parameter set (SPS), a picture parameter set (PPS), and so on. When a NAL unit includes video data, the NAL unit is configured to include, in the payload, video data in a unit called a slice resulting from dividing a picture. It is to be noted that a NAL unit type of a NAL unit of slices which belong to the same picture has the same value.

FIG. 5 is a diagram which illustrates a NAL unit type related to the RAP picture and the leading picture.

For the NAL unit type of a NAL unit including the RAP picture (slice of RAP picture), 16 to 18 are used when the RAP picture is a BLA picture, 19 and 20 are used when the RAP picture is an IDR picture, and 21 is used when the RAP picture is a CRA picture.

More specifically, when BLA_W_LP (16) is set to a NAL unit type, the NAL unit type indicates that there is a possibility that the leading picture of the BLA picture is included in an image signal. When BLA_W_RADL (17) is set to a NAL unit type, the NAL unit type indicates that there is a possibility that the leading picture of the BLA picture is included in an image signal, and the leading picture is a decodable RADL picture only (not a RASL picture). When BLA_N_RADL (18) is set to a NAL unit type, the NAL unit type indicates that there is a possibility that the leading picture of the BLA picture is not included in an image signal.

In addition, when IDR_W_RADL (19) is set to a NAL unit type, the NAL unit type indicates that there is a possibility that the leading picture of the IDR picture is included in an image signal, and the leading picture is a decodable RADL only (not a RASL picture). When IDR_N_LP (20) is set to a NAL unit type, the NAL unit type indicates that there is a possibility that the leading picture of the IDR picture is not included in an image signal.

In addition, when CRA_NUT (21) is set to a NAL unit type, the NAL unit type indicates that there is a possibility that the leading picture of the CRA picture is included in an image signal, and the leading picture can either be a decodable RADL or a RASL that cannot be decoded.

In addition, as described above, two types of leading pictures are defined; that is, a RADL picture and a RASL picture. In the NAL unit type of a NAL unit which includes a RADL picture (slice of a RADL picture), 6 (or 7) that means a RADL picture is inserted. In addition, in the NAL unit type of a NAL unit which includes a RASL picture (slice of a RASL picture), 8 (or 9) that means a RASL picture is inserted.

However, a parameter which indicates the restriction on the reference relation such as the NAL unit types described above might be incorrect in some cases. In such a case, inconsistency arises in the reference relation in image signals, and there is a problem that an error is likely to occur due to the inconsistency in the reference relation with the image processing methods according to NPL 1 and NPL 2.

In order to solve such a problem, an image processing method according to an aspect of the present disclosure is an image processing method for processing an image signal generated by encoding a plurality of pictures, the image processing method including: obtaining a parameter from the image signal, the parameter indicating restriction on a reference relation between at least one of the plurality of pictures and an other one of the plurality of pictures in the encoding; and performing restriction alleviation processing for alleviating the restriction on the reference relation indicated by the parameter.

With this, even when restriction on a reference relation indicated by a parameter, such as a NAL unit type and a temporal nesting flag, is falsely strict because the parameter is incorrect, the restriction on the reference relation is alleviated. It is therefore possible to suppress an error resulting from inconsistency that occurs between the restriction on the reference relation indicated by the parameter and an actual reference relation in image signals (relation indicated by a number of a reference picture, or the like) or a reference relation indicated by another parameter (different NAL unit type). Thus, it is possible to prevent decoding on an image signal from ending due to an error, for example.

In addition, the image signal may include a plurality of network abstraction layer (NAL) units which are signal units, in the obtaining, a NAL unit type included in a target NAL unit to be processed which is any one of the plurality of NAL units may be obtained as the parameter, and in the performing, when the NAL unit type is a first NAL unit type, a second NAL unit type may be applied to the target NAL unit instead of the first NAL unit type, the second NAL unit type defining alleviated restriction which is less strict than restriction on a reference relation defined by the first NAL unit type.

With this, even when the first NAL unit type included in an image signal is incorrect, the second NAL unit type in which restriction on a reference relation is alleviated is applied to a target NAL unit which is a target for processing, and thus it is possible to properly suppress the above-described inconsistency from occurring.

In addition, in the performing, when the first NAL unit type defines forbidding a reference relation in which a subsequent picture subsequent in decoding order to a broken link access (BLA) picture which is a starting point of random access reproduction and corresponds to the target NAL unit refers, as a leading picture which precedes the BLA picture in display order, to an other picture, the second NAL unit type which defines permitting the reference relation may be applied to the target NAL unit, instead of the first NAL unit type.

With this, instead of the first NAL unit type which does not permit the presence of a leading picture (for example, BLA_N_LP), the second NAL unit type which permits the presence of a leading picture (for example, BLA_W_RADL or BLA_W_LP) is applied to the target NAL unit. Accordingly, even when a NAL unit type of a subsequent NAL unit that is subsequent to the target NAL unit in decoding order indicates a leading picture, it is possible to suppress occurrence of inconsistency of the NAL unit type between the target NAL unit and the subsequent NAL unit.

In addition, in the performing, when the first NAL unit type defines forbidding a reference relation in which the subsequent picture refers, as the leading picture, to a picture which precedes the BLA picture in decoding order, the second NAL unit type which defines permitting the reference relation may be applied to the target NAL unit, instead of the first NAL unit type.

With this, instead of the first NAL unit type which does not permit the presence of a RASL picture which is a leading picture (for example, BLA_N_LP), the second NAL unit type which permits the presence of the RASL picture (for example, BLA_W_RADL or BLA_W_LP) is applied to the target NAL unit. Accordingly, even when a NAL unit type of a subsequent NAL unit that is subsequent to the target NAL unit in decoding order indicates a RASL picture, it is possible to suppress occurrence of inconsistency of the NAL unit type between the target NAL unit and the subsequent NAL unit.

In addition, in the performing, when the first NAL unit type defines forbidding a reference relation in which a subsequent picture subsequent in decoding order to an instantaneous decoding refresh (IDR) picture which is a starting point of random access reproduction and corresponds to the target NAL unit refers, as a leading picture which precedes the IDR picture in display order, to an other picture, the second NAL unit type which defines permitting the reference relation may be applied to the target NAL unit, instead of the first NAL unit type.

With this, instead of the first NAL unit type which does not permit the presence of a leading picture (for example, IDR_N_LP), the second NAL unit type which permits the presence of a leading picture (for example, IDR_W_RADL) is applied to the target NAL unit. Accordingly, even when a NAL unit type of a subsequent NAL unit that is subsequent to the target NAL unit in decoding order indicates a leading picture, it is possible to suppress occurrence of inconsistency of the NAL unit type between the target NAL unit and the subsequent NAL unit.

In addition, in the performing, when the first NAL unit type defines that a picture corresponding to the target NAL unit is: a random access skipped leading (RASL) picture that (i) is a leading picture which is subsequent in decoding order to a random access point (RAP) picture that is a starting point of the random access reproduction and which precedes the RAP picture in display order and (ii) has a reference relation in which decoding is impossible when the random access reproduction is performed, the second NAL unit type may be applied to the target NAL unit instead of the first NAL unit type, and the picture is decoded, the second NAL unit type defining that the picture is a random access decodable leading (RADL) picture that is the leading picture and has a reference relation in which decoding is possible even when the random access reproduction is performed.

With this, instead of the first NAL unit type (for example, RASL), the second NAL unit type (for example, RADL) is applied to the target NAL unit. Accordingly, even when a picture of a target NAL unit that is subsequent to the RAP picture in decoding order is set, falsely as a RASL picture, so as not to be decoded at the time of random access reproduction in spite of the fact that the picture does not refer to other pictures which precede the RAP picture in decoding order, it is possible to properly decode the picture of the target NAL unit at the time of random access reproduction.

In addition, when the picture is decoded, reference picture information corresponding to the picture may be decoded, when a reference picture identified by the decoded reference picture information is stored in a buffer, the picture may be decoded by referring to the reference picture, and when the reference picture is not stored in the buffer, an alternative picture may be generated, and the picture may be decoded by referring to the alternative picture as the reference picture.

For example, since the second NAL unit type, instead of the first NAL unit type, is applied to a target NAL unit, the second NAL unit type (for example, RADL) which is false is applied to the target NAL unit when the first NAL unit type (for example, RASL) is correct. Accordingly, when a picture of a target NAL unit, which is actually a RASL picture, is reproduced as a RADL picture in the random access reproduction, a reference picture of the picture is not stored in a buffer in some cases. In view of the above, when the reference picture is not stored in the buffer as described above, an alternative picture is generated and referred to as the reference picture, and thus it is possible to properly decode the picture of the target NAL unit.

In addition, the plurality of pictures may be each classified into any one of a plurality of layers, and encoded without referring to a picture which belongs to a layer of a higher level than a layer to which the picture belongs, in the obtaining, a flag may be obtained as the parameter, the flag forbidding a target picture to be processed among the plurality of pictures from referring to, in a predetermined state, a lower level picture which belongs to a layer of a lower level than a layer to which the target picture belongs, and in the performing, whether or not the lower level picture is stored in a buffer may be determined, and when it is determined that the lower level picture is not stored in the buffer, the lower level picture may be decoded, and the target picture may be decoded by referring to the decoded lower level picture without complying with the flag.

For example, in the case where the above-described flag (for example, a temporal nesting flag which indicates true (1)) is falsely included in an image signal in spite of the fact that a target picture to be processed refers to a lower level picture, the target picture cannot refer to the lower level picture because the lower level picture is not stored in the buffer, in some cases. In view of the above, when a lower level picture is not stored in the buffer, since the lower level picture is decoded and alleviation allows referring to the lower level picture which is forbidden by the flag as described above, it is possible to properly decode the target picture.

In addition, the image signal may include a plurality of NAL units which are signal units, and each of pictures corresponding to a different one of the plurality of NAL units may be classified into any one of a plurality of layers, and encoded without referring to a picture which belongs to a layer of a higher level than a layer to which the picture belongs, in the obtaining, a NAL unit type may be obtained as the parameter, the NAL unit type being included in a NAL unit corresponding to a target picture to be processed among the plurality of pictures, and defining forbidding a reference relation in which the target picture refers to a specific picture which belongs to a same layer as the target picture, the image processing method further includes, determining, when restriction is imposed on a layer to which a picture to be decoded among the plurality of pictures belongs, whether or not upswitching for alleviating the restriction on the layer is possible for the target picture, based on the obtained NAL unit type and the layer to which the target picture belongs, and in the performing, when it is determined that the upswitching is possible, whether or not the specific picture is stored in a buffer may be determined, the specific picture being a reference picture to which the target picture refers, and when it is determined that the specific picture is not stored in the buffer, the reference picture may be decoded, and the target picture may be decoded by referring to the reference picture, which is forbidden by the NAL unit type.

For example, when a NAL unit type, such as TSA or STSA, which forbids a reference relation in which a specific picture is referred to is falsely included in a NAL unit, in spite of the fact that a target picture refers to the specific picture, there is the case where the target picture to be processed cannot refer to the specific picture at the time of upswitching because the specific picture is not stored in a buffer. In view of the above, when a specific picture is not stored in the buffer as a reference picture, since the reference picture is decoded and alleviation allows referring to the reference picture which is forbidden by the NAL unit type as described above, it is possible to properly decode the target picture.

In addition, in the determining, when: a temporal sub-layer access (TSA) picture is obtained as the NAL unit type, the TSA defining adding, as a layer to which a picture to be decoded among the plurality of pictures belongs, a layer to which the target picture belongs and a layer of a higher level than the layer to which the target picture belongs; and the layer to which the target picture belongs is of a highest level among layers to which pictures decoded prior to the target picture in decoding order belong, it may be determined that the upswitching is possible.

With this, it is possible to properly perform upswitching according to TSA.

In addition, in the determining, when: a step-wise temporal sub-layer access (STSA) picture is obtained as the NAL unit type, the STSA defining adding, as a layer to which a picture to be decoded among the plurality of pictures belongs, only a layer to which the target picture belongs; and the layer to which the target picture belongs is of a highest level among layers to which pictures decoded prior to the target picture in decoding order belong, it may be determined that the upswitching is possible.

With this, it is possible to properly perform upswitching according to STSA.

In addition, in the performing, a NAL unit including the second NAL unit type may be generated by replacing the first NAL unit type included in the target NAL unit with the second NAL unit type.

With this, since an image signal is edited by a new image signal with an alleviated reference relation, an image decoding apparatus, for example, can perform decoding of an image in which occurrence of an error is suppressed, without performing special processing.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are specifically described with reference to the Drawings.

Each of the exemplary embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the Claims. Therefore, among the structural elements in the following embodiments, structural elements not recited in any one of the independent claims are described as arbitrary structural elements.

Embodiment 1

An embodiment according to the present disclosure will be described below with reference to the drawings.

First, an overall operation of a decoder (image processing apparatus) which decodes a bit stream encoded by HEVC scheme, which is assumed by the inventors, will be described with reference to FIG. 6.

Figure 6:
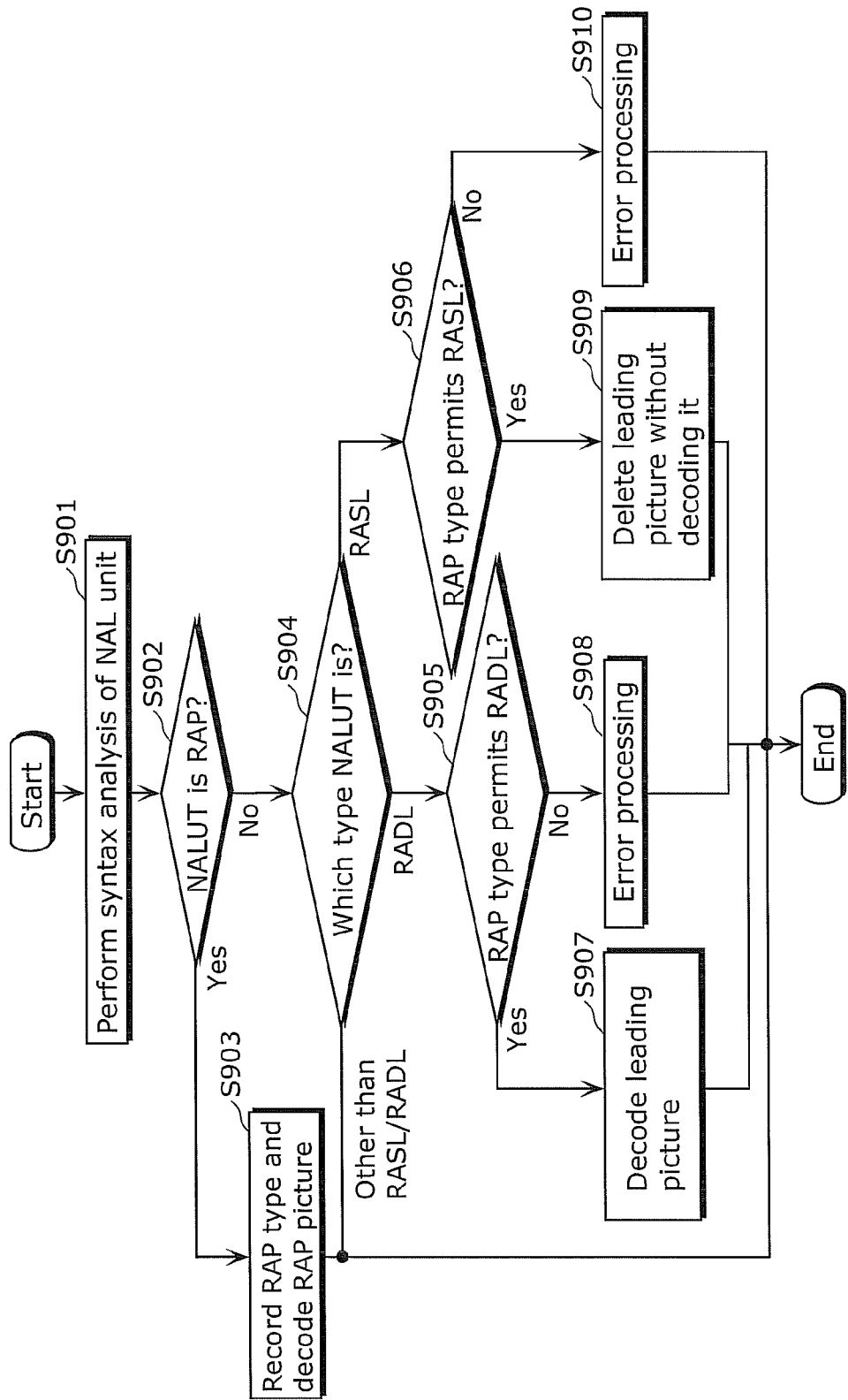
FIG. 6 is a flowchart which illustrates an operation of a decoder which is an image processing apparatus according to Embodiment 1.

FIG. 6 is a flowchart which illustrates an operation of a decoder which is an image processing apparatus according to this exemplary embodiment.

The decoder performs syntax analysis of a NAL unit included in an image signal, and obtains a NAL unit type from the NAL unit (Step S901). Next, the decoder determines whether or not the NAL unit type (NALUT) is a RAP (Step S902). More specifically, the decoder determines whether or not the NAL unit type is any one of 16 to 21. Here, when it is determined that that the NAL unit type is any one 16 to 21, the decoder recognizes that a picture (slice) included in the NAL unit is the RAP picture (Yes in Step S902). Then, the decoder records the RAP type (NAL unit type) on an internal memory, and decodes the RAP picture (Step S903). Then, when a subsequent picture that is subsequent to the RAP picture in decoding order is present, the decoder performs the processes from Step S901 again and tries to decode the subsequent picture.

When it is determined that that the NAL unit type is not the RAP (No in Step S902), the decoder determines which type a NAL unit type (NALUT) obtained from the NAL unit related to the subsequent picture that is subsequent to the RAP picture is (Step S904).

Here, when it is determined that the NAL unit type is 6 or 7, in other words, a RADL (RADL in Step S904), the decoder determines whether or not the RAP type (NAL unit type) recorded in Step S903 permits the presence of a RADL picture (Step S905). When the presence of the RADL picture is permitted (Yes in Step S905), the decoder decodes the subsequent picture (leading picture) which is the RADL picture (Step S907). When the presence of the RADL picture is not permitted (No in Step S905), the decoder performs predetermined error processing because the presence of the RADL picture means an error (Step S908).

When the NAL unit type is 8 or 9 (RASL), in other words, a RASL in Step S904, the decoder determines whether or not the RAP type (NAL unit type) recorded in Step S903 permits the presence of the RASL picture (Step S906). When the presence of the RASL picture is permitted (Yes in Step S906), the decoder deletes the subsequent picture (leading picture) which is the RASL picture without decoding it (Step S909). It is to be noted that, the case where the presence of the RASL picture is permitted is the case where the RAP type (NAL unit type) is a type in which a RASL picture can be present, such as CRA and BLA. On the other hand, when the presence of the RASL picture is not permitted (No in Step S906), the decoder performs a predetermined error processing because the presence of the RASL picture means an error (Step S910). It is to be noted that, the case where the presence of the RASL picture is not permitted is the case where the RAP type (NAL unit type) is a type in which the RASL picture is not permitted to be present, such as IDR.

Figure 7:
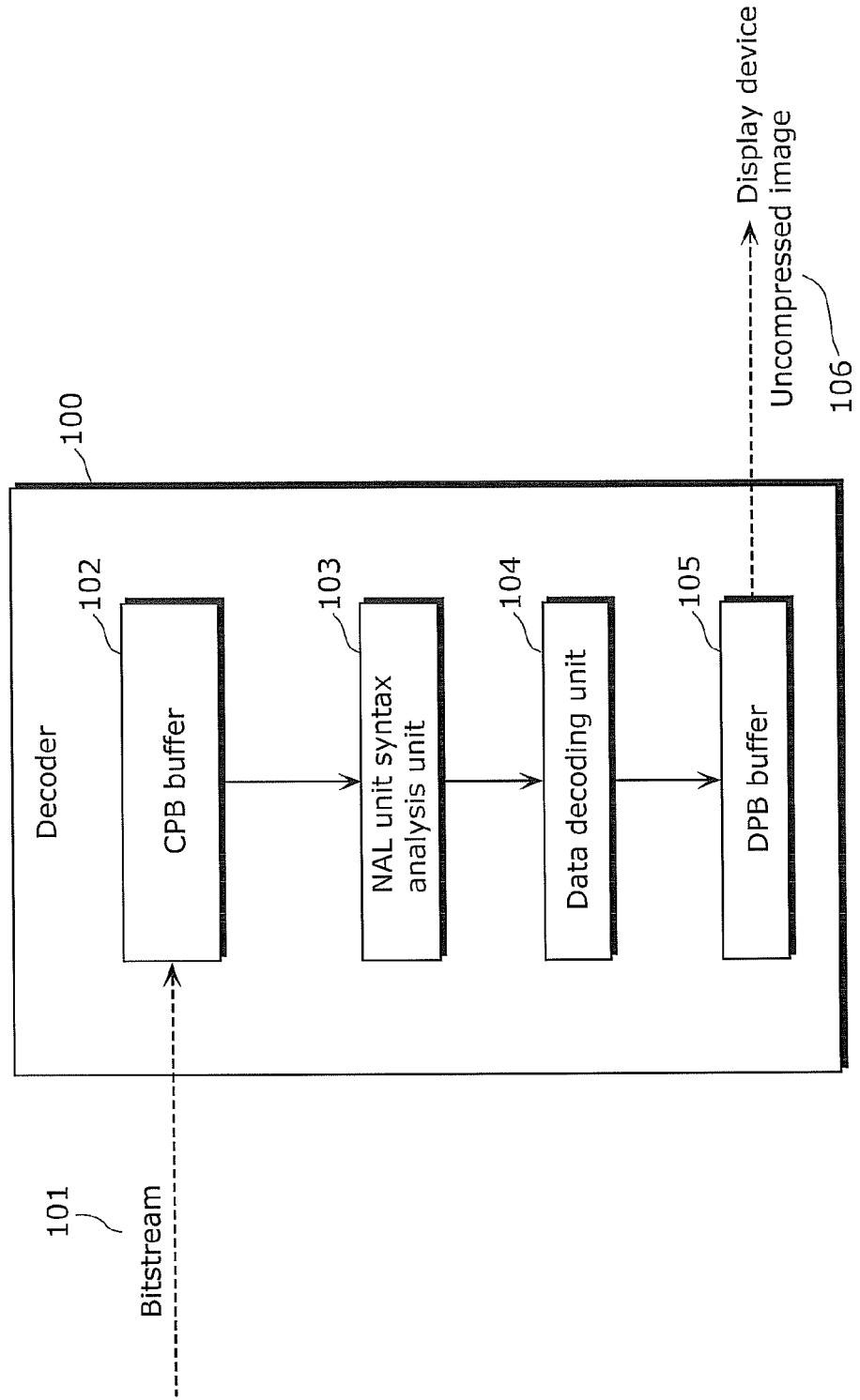
FIG. 7 is a block diagram which illustrates a configuration of the image processing apparatus which is a decoder according to Embodiment 1.

FIG. 7 is a block diagram which illustrates a configuration of an image processing apparatus which is the decoder according to this exemplary embodiment.

A decoder (image decoding apparatus) 100 includes: a coded picture buffer (CPB) 102; a NAL unit syntax analysis unit 103; a data decoding unit 104; and a decoded picture buffer (DPB) 105, as illustrated in FIG. 7.

The CPB buffer 102 is a buffer which holds a bit stream 101 that is an image signal provided to the decoder 100. The CPB buffer 102 outputs a bit stream to the NAL unit syntax analysis unit 103 with a predetermined timing for each picture (access unit).

The NAL unit syntax analysis unit 103 analyzes syntax of a NAL unit included in the bit stream. More specifically, the NAL unit syntax analysis unit 103 analyzes a NAL unit header to obtain information such as a NAL unit type and so on. Then, the NAL unit syntax analysis unit 103 transmits a payload included in the NAL unit to the data decoding unit 104 or the like.

The data decoding unit 104 decodes the payload (encoded video data) transmitted from the NAL unit syntax analysis unit 103.

The DPB buffer 105 holds the picture (uncompressed image 106) decoded by the data decoding unit 104. The decoded picture is inputted to the DPB buffer in decoding order indicated in (b) in FIG. 1, for example, and outputted to a display device or the like in outputting order in (a) in FIG. 1.

Figure 8:
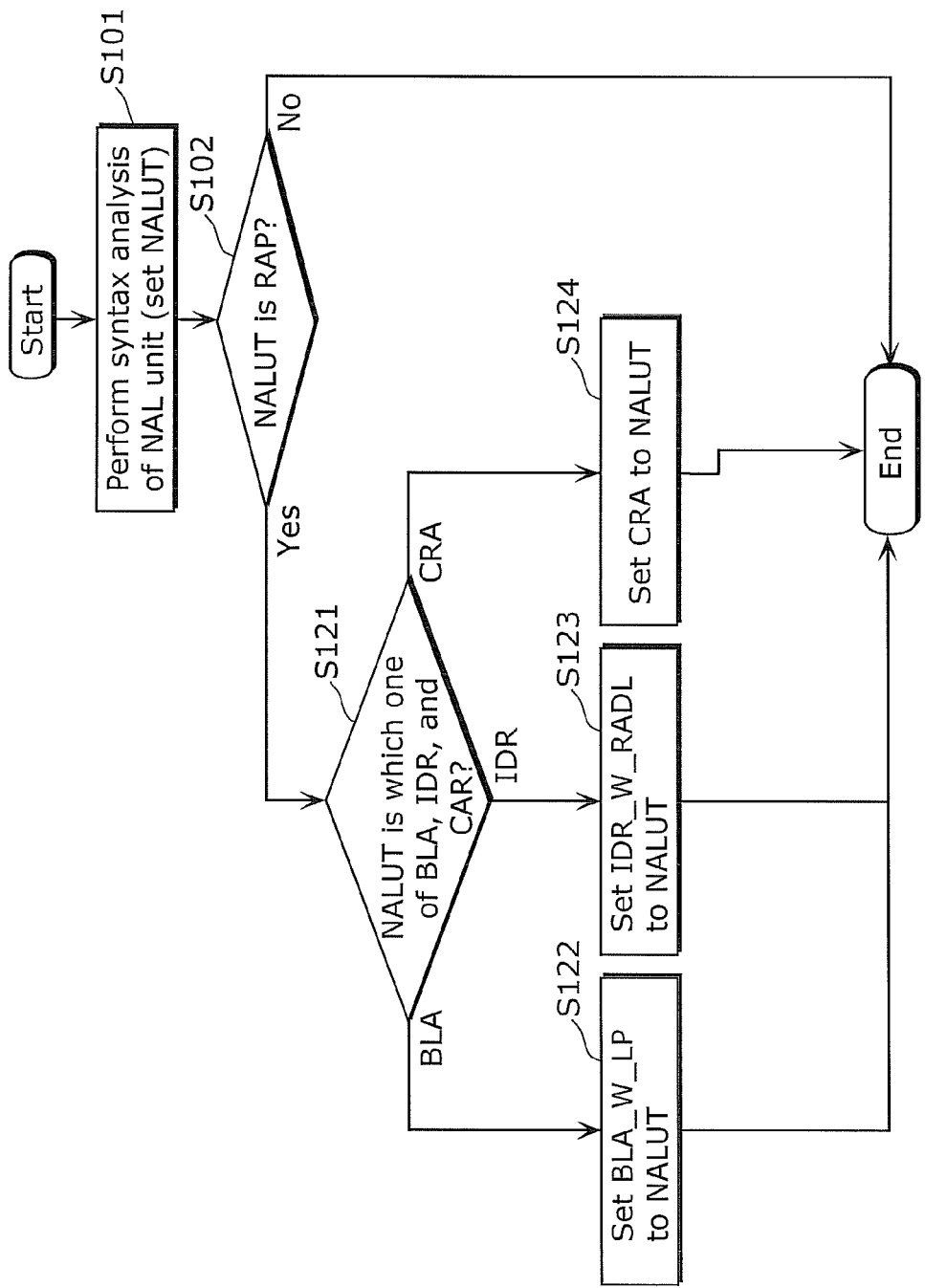
FIG. 8 is a flowchart which illustrates an operation of a NAL unit syntax analysis unit of the decoder according to Embodiment 1.

FIG. 8 is a flowchart which illustrates an operation of the NAL unit syntax analysis unit 103 of the decoder 100 according to this exemplary embodiment. Upon receiving an input of the picture (access unit) from the CPB buffer 102, the NAL unit syntax analysis unit 103 performs syntax analysis sequentially on each NAL unit included in the access unit Then, the NAL unit syntax analysis unit 103 obtains a NAL unit type from the NAL unit in the same manner as in Step S901 illustrated in FIG. 6 (Step S101). It is to be noted that a NAL unit type of a NAL unit of slices which belong to the same picture has the same value. The NAL unit syntax analysis unit 103, at this time, sets the obtained NAL unit type as a first NAL unit type. Next, the NAL unit syntax analysis unit 103 determines whether or not the obtained NAL unit type is a RAP, in the same manner as in Step S902 illustrated in FIG. 6 (Step S102). When the obtained NAL unit type is the RAP (Yes in Step S102), the NAL unit syntax analysis unit 103 determines which one of BLA, IDR, and CAR the NAL unit type is (Step S121).

When the NAL unit type is any one of three types of BLA indicated by values of 16 to 18 described above (BLA in Step S121), the NAL unit syntax analysis unit 103 sets BLA_W_LP (16) as a second NAL unit type (Step S122). BLA_W_LP is a NAL unit type which permits the presence of a leading picture such as a RASL picture and a RADL picture, for the BLA picture as described above. It is to be noted that the NAL unit syntax analysis unit 103 may check the NAL unit type of a subsequent leading picture and set BLA_W_RADL as the second NAL unit type when the RASL picture is not present.

When the NAL unit type is one of two types of IDR indicated by 19 or 20 as described above (IDR in Step S121), the NAL unit syntax analysis unit 103 sets IDR_W_RADL (19) as the second NAL unit type. IDR_W_RADL is a NAL unit type which permits the presence of a leading picture (only RADL) for the IDR picture as described above.

When the NAL unit type is CRA indicated by a value of 21 as described above (CRA in Step S121), the NAL unit syntax analysis unit 103 sets CRA as the second NAL unit type (Step S124).

It is to be noted that the processes in each step indicated by the flowchart in FIG. 8 are executed in Step S901 illustrated in FIG. 6. More specifically, for the NAL unit of the RAP analyzed in Step S901 illustrated in FIG. 6, the second NAL unit type is applied instead of the NAL unit type included in the NAL unit (the first NAL unit type). Accordingly, in Step S903 illustrated in FIG. 6, the second NAL unit type is recorded as the RAP type.

As described above, the decoder 100 sets, as the second NAL unit type, the NAL unit type which permits the leading picture and performs a decoding operation based on the second NAL unit type. By the editing of the NAL unit type into a NAL unit type which permits a leading picture, even when an error stream in which a leading picture is present in spite of the fact that the leading picture is not permitted, the decoder 100 is capable of decoding the error stream. In other words, it is possible to suppress execution of the processes of Step S908 and Step S910 illustrated in FIG. 6.

In sum, the image processing method according to this exemplary embodiment includes: obtaining a NAL unit type indicating restriction on a reference relation from an image signal; and executing restriction alleviation processing for alleviating the restriction on the reference relation indicated by the NAL unit type.

With this, when the restriction on a reference relation indicated by the NAL unit type is falsely strict because the NAL unit type is incorrect, the restriction on the reference relation is alleviated. It is therefore possible to suppress an error resulting from inconsistency that occurs between the restriction on the reference relation indicated by the NAL unit type of a NAL unit and the reference relation indicated by the NAL unit type of another NAL unit. Thus, it is possible to prevent decoding on an image signal from ending due to an error.

For example, in obtaining of the NAL unit type, a NAL unit type included in a target NAL unit which is a target for processing among a plurality of NAL units is obtained. Then, in executing of the restriction alleviation processing, when the NAL unit type is the first NAL unit type, the second NAL unit type in which alleviated restriction which is less strict than restriction on the reference relation defined for the first NAL unit type is defined is applied to the target NAL unit, instead of the first NAL unit type.

With this, even when the first NAL unit type included in an image signal is incorrect, the second NAL unit type in which the restriction on a reference relation is alleviated is applied to the target NAL unit, and thus it is possible to properly suppress the above-described inconsistency from occurring.

More specifically, the first NAL unit type forbids the reference relation in which a subsequent picture that is subsequent to, in decoding order, a BLA picture which is a starting point of random access reproduction and corresponds to a target NAL unit, as a leading picture which precedes the BLA picture in display order, refers to other pictures. In this case, in executing of the restriction alleviation processing, the second NAL unit type which defines permitting the reference relation is applied to the target NAL unit, instead of the first NAL unit type.

With this, instead of the first NAL unit type (BLA_N_LP) which does not permit the presence of a leading picture, the second NAL unit type (BLA_W_RADL or BLA_W_LP) which permits the presence of a leading picture is applied to the target NAL unit. Accordingly, even when a NAL unit type of a subsequent NAL unit that is subsequent to the target NAL unit in decoding order indicates a leading picture, it is possible to suppress occurrence of inconsistency of the NAL unit type between the target NAL unit and the subsequent NAL unit.

In addition, the first NAL unit type forbids a reference relation in which a subsequent picture refers, as a leading picture, to a picture preceding the BLA picture in decoding order. Also in this case, in executing of the restriction alleviation processing, the second NAL unit type which defines permitting the reference relation is applied to the target NAL unit, instead of the first NAL unit type.

With this, instead of the first NAL unit type (BLA_N_LP or BLA_W_RADL) which does not permit the presence of a RASL picture which is a leading picture that refers to a picture preceding the BLA picture in decoding order, the second NAL unit type (BLA_W_LP) which permits the presence of the RASL picture is applied to the target NAL unit. Accordingly, even when a NAL unit type of a subsequent NAL unit that is subsequent to the target NAL unit in decoding order indicates a RASL picture, it is possible to suppress occurrence of inconsistency of the NAL unit type between the target NAL unit and the subsequent NAL unit.

In addition, the first NAL unit type forbids a reference relation in which a subsequent picture that is subsequent, in decoding order, to an IDR picture which is a starting point of random access reproduction and corresponds to a target NAL unit refers, as a leading picture which precedes the IDR picture in decoding order, to other pictures. Also in this case, in executing of the restriction alleviation processing, the second NAL unit type which defines permitting the reference relation is applied to the target NAL unit, instead of the first NAL unit type.

With this, instead of the first NAL unit type (IDR_N_LP) which does not permit the presence of a leading picture, the second NAL unit type (IDR_W_RADL) which permits the presence of a leading picture is applied to the target NAL unit. Accordingly, even when a NAL unit type of a subsequent NAL unit that is subsequent in decoding order to the target NAL unit indicates a leading picture, it is possible to suppress occurrence of inconsistency of the NAL unit type between the target NAL unit and the subsequent NAL unit.

Embodiment 2

In Embodiment 1 described above, the second NAL unit type is applied to the NAL unit of the RAP, instead of the NAL unit type included in the NAL unit (the first NAL unit type). In Embodiment 2, the second NAL unit type is applied to a NAL unit other than the RAP, instead of the NAL unit type included in the NAL unit (the first NAL unit type).

Figure 9:
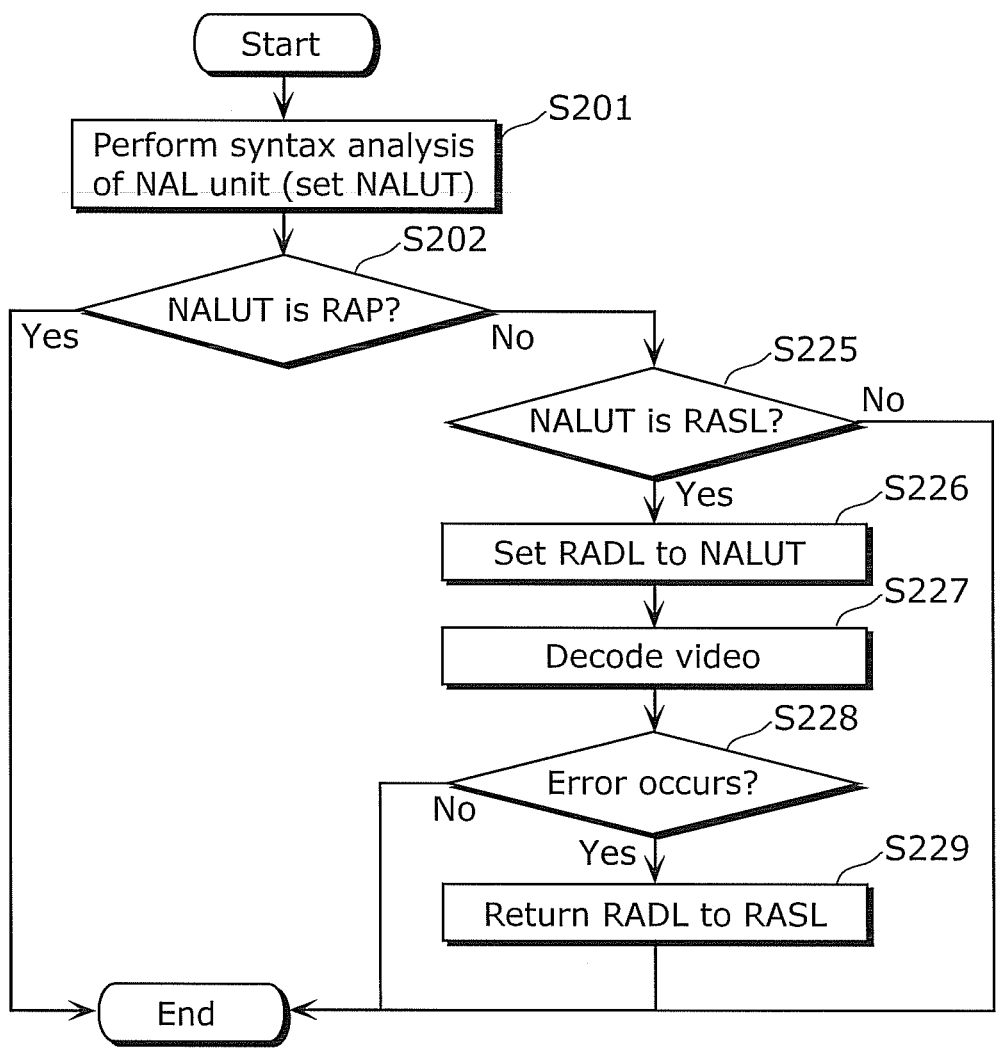
FIG. 9 is a flowchart which illustrates an operation of the NAL unit syntax analysis unit of the decoder according to Embodiment 2.

FIG. 9 is a flowchart which illustrates an operation of the NAL unit syntax analysis unit of the decoder 100 according to this exemplary embodiment.

The NAL unit syntax analysis unit 103 obtains a NAL unit type from a NAL unit in the same manner as in Step S902 illustrated in FIG. 6 (Step S201). The NAL unit syntax analysis unit 103, at this time, sets the obtained NAL unit type as a first NAL unit type. In addition, the NAL unit syntax analysis unit 103 determines whether or not the obtained NAL unit type is a RAP, in the same manner as in Step S902 illustrated in FIG. 6 (Step S202). When the obtained NAL unit type is not a RAP (No in Step S202), the NAL unit syntax analysis unit 103 determines whether or not the NAL unit type is a RASL (Step S225). When the obtained NAL unit type is the RASL (Yes in Step S225), the NAL unit syntax analysis unit 103 sets the RADL as the second NAL unit type (Step S226) More specifically, the RASL which is the first NAL unit type is changed to the RADL which is the second NAL unit type.

In a bit stream which includes an error (error stream), there is a possibility that a NAL unit type indicating that a picture is a RASL picture is assigned, in spite of the fact that the picture is a picture that can be decoded. For that reason, the processes of Step S226 is performed. Although the second NAL unit type is set as described above, there is a possibility that decoding is really impossible, and thus the NAL unit syntax analysis unit 103 decodes video (Step S227). More specifically, the NAL unit syntax analysis unit 103 decodes a slice header included in the NAL unit, and obtains a number of a reference picture (reference picture information) which is indicated in the slice header. Then, the NAL unit syntax analysis unit 103 determines whether an error occurs or not, based on the number of the reference picture (Step S228). More specifically, the NAL unit syntax analysis unit 103 determines whether or not a picture corresponding to the number of the reference picture (picture number) is present in the DPB buffer 105, and determines that an error will occur when the reference picture is not present. When it is determined that an error will occur (Yes in Step S228), the NAL unit syntax analysis unit 103 returns the second NAL unit type to the first NAL unit type (Step S229). More specifically, the RADL which is the second NAL unit type is returned to the RASL which is the first NAL unit type.

It is to be noted that the process in each step indicated by the flowchart in FIG. 9 is executed in Step S901 illustrated in FIG. 6. More specifically, for a NAL unit which is analyzed in Step S901 illustrated in FIG. 6 and is not the RAP, the second NAL unit type=RADL is applied instead of the NAL unit type (first NAL unit type=RASL) included in the NAL unit, unless it is determined that an error will occur in Step S228 illustrated in FIG. 9.

In other words, according to this exemplary embodiment, the first NAL unit type indicates that a picture corresponding to the target NAL unit is RASL picture which is: a leading picture that (i) is subsequent, in decoding order, to the RAP picture which is the starting point of the random access reproduction and (ii) precedes the RAP picture in display order; and has a reference relation in which decoding is impossible when the random access reproduction is performed. In this case, in executing of the restriction alleviation processing, the second NAL unit type which defines that the picture is a RADL picture which is a leading picture and has a reference relation in which decoding is possible even when the random access reproduction is performed is applied, instead of the first NAL unit type, to the target NAL unit and the picture is decoded.

With this, instead of the first NAL unit type (RASL), the second NAL unit type (RADL) is applied to the target NAL unit. Accordingly, even when a picture of a target NAL unit which is subsequent to the RAP picture in decoding order is set, falsely as a RASL picture, so as not to be decoded at the time of random access reproduction in spite of the fact that the picture does not refer to other pictures which precede the RAP picture in decoding order, it is possible to properly decode the picture of the target NAL unit at the time of random access reproduction.

According to the above-described example, the NAL unit type is returned to the RASL which is the type before change when it is determined that an error will occur in Step S228, however, the NAL unit type is not necessarily be returned. In this case, the data decoding unit 104 of the decoder 100 performs video decoding with error correction. More specifically, the data decoding unit 104 generates an alternative picture as a reference picture, and decodes the RADL picture with reference to the reference picture. The alternative picture is, for example, a gray image having 0 chromaticity and luminance that is a median value of possible values.

More specifically, in decoding of a RADL picture, reference picture information corresponding to the RADL picture is decoded, and when a reference picture which is identified by the decoded reference picture information is stored in the DPB buffer 105, the RADL picture is decoded by referring to the reference picture. On the other hand, when the reference picture is not stored in the DPB buffer 105, an alternative picture is generated, and the RADL picture is decoded by referring to the alternative picture as the reference picture.

For example, in Step S226, since the second NAL unit type is applied to the target NAL unit instead of the first NAL unit type, when the first NAL unit type (RASL) is correct, the second NAL unit type (RADL) which is incorrect is applied to the target NAL unit. Accordingly, when a picture of the target NAL unit, which is actually a RASL picture, is reproduced as a RADL picture in the random access reproduction, a reference picture of the picture is not stored in the DPB buffer 105 in some cases. In view of the above, when the reference picture is not stored in the DPB buffer 105 as described above, an alternative picture is generated and referred to as the reference picture, and thus it is possible to properly decode the picture of the target NAL unit.

In addition, the decoder 100, without returning the NAL unit type to the RASL that is a type before change, may output a decoded RAP picture corresponding to the RADL picture instead of the RADL picture, as video decoding with error correction. Alternatively, the decoder 100 may output a picture which is decoded most recently instead of the RADL picture, or may not output a picture. In this case, in drawing means, frame update is not performed for the error picture (RADL picture), and an image drawn immediately before is displayed as it is.

(Modification)

According to Embodiment 2 described above, it is determined whether the NAL unit type is RAP or RASL, however, this determination is not necessarily been performed. In this modification, a picture of a NAL unit to which an incorrect NAL unit type is applied is decoded without performing the determination processes described above.

Figure 10:
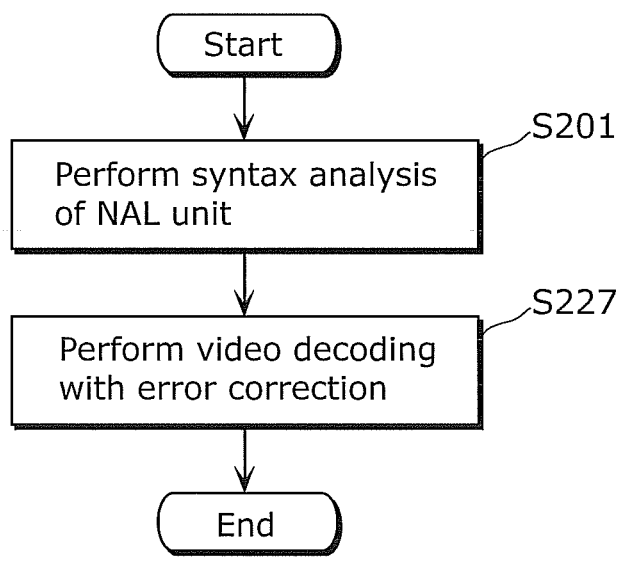
FIG. 10 is a flowchart which illustrates an operation of the decoder according to a modification example of Embodiment 2.

FIG. 10 is a flowchart illustrating operations performed by the image decoding apparatus 100 according to this Modification.

The NAL unit syntax analysis unit 103 obtains a NAL unit type from a NAL unit in the same manner as in Step S901 illustrated in FIG. 6 (Step S201). Next, the data decoding unit 104 performs the above-described video decoding with error correction, when the NAL unit type is set as a RADL in spite of the fact that it is actually a RASL (Step S227). With this, it is possible to prevent the process from branching based on the NAL unit type, making it possible to simplify the operations of the decoder 100.

As described in each of the Embodiments and the Modification, with the decoder 100 which is the image processing apparatus according to an aspect of the present disclosure, it is possible to properly decode even when an irrelevant NAL unit type is assigned due to an error. It is to be noted that the present disclosure may be implemented not as the image processing apparatus or the image processing method which involves image decoding as in each of the Embodiments and the Modification described above but as an image processing method or an image processing apparatus which rewrite a NAL unit type included in a NAL unit of an inputted bit stream, and outputs, to a decoding device, a bit stream including the NAL unit type which has been rewritten as a second bit stream. In sum, the present disclosure may be implemented as an image processing method or an image processing apparatus which performs only editing on an image signal without decoding the image signal. In this case, in executing restriction alleviation processing, a NAL unit including the second NAL unit type is generated by replacing the first NAL unit type included in the target NAL unit with the second NAL unit type.

Embodiment 3

An image processing method according to this exemplary embodiment has a feature in permitting referring to a predetermined reference picture when it is forbidden to refer to the predetermined reference picture because a NAL unit type is TSA or STSA that will be described later or a temporal nesting flag that will be described later is true.

FIG. 11 is a diagram which illustrates NAL unit types used in this exemplary embodiment.

A temporal sub-layer access picture (TSA picture) and a step-wise temporal sub-layer access picture (STSA picture) are pictures for which a target layer that is a target for decoding (transmitting) can be expanded at the time of scalable decoding (or transmitting). When the NAL unit type of a NAL unit is 2 or 3 (TSA), the NAL unit includes a TSA picture (slice). In addition, when the NAL unit type of a NAL unit is 4 or 5 (STSA), the NAL unit includes a STSA picture (slice).

Figure 12:
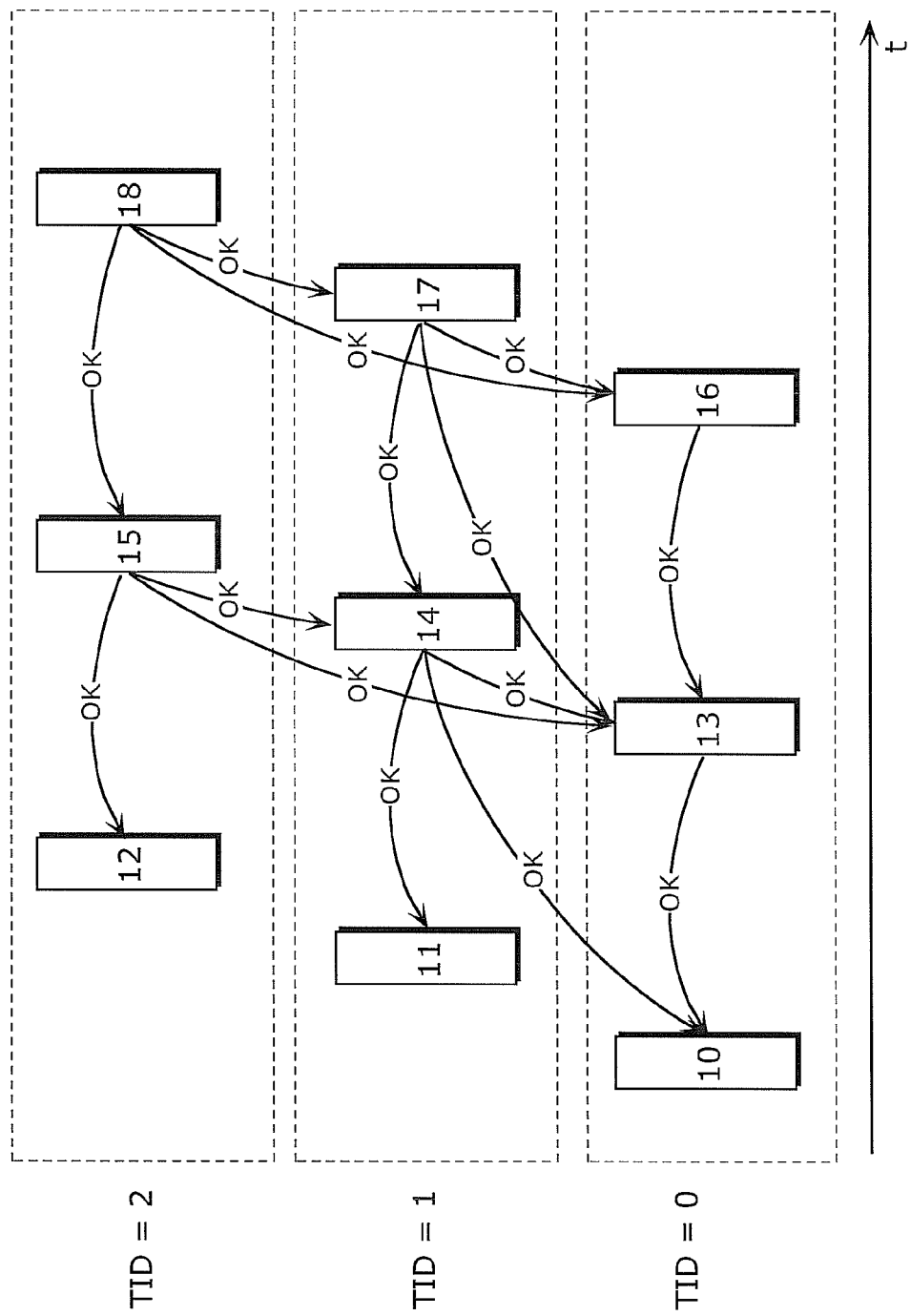
FIG. 12 is a diagram for explaining scalable decode used in Embodiment 3.

FIG. 12 is a diagram for describing the scalable decoding.

A temporal ID (TID) is described in a NAL unit header of a NAL unit. TID is identification information which indicates a level (layer) of a reference relation, is an integer greater than or equal to 0, and indicates that the importance of the NAL unit increases as the value is smaller. For example, when there are a NAL unit M having TID=m and a NAL unit N having TID=n, and m<n is satisfied, the NAL unit M does not refer to the NAL unit N in inter picture prediction. The NAL unit M can be decoded independently of the NAL unit N. A NAL unit with a small TID value can be decoded independently of a NAL unit with a large TID value.

A scalable decoding is to perform decoding by thinning pictures when a decoder lacks processing capacity, when a decoder performs high-speed reproduction, or when a network system decreases a transmission rate.

In FIG. 12, each of the rectangle boxes is a picture (NAL unit), a numerical value in the box indicates a decoding order, and a TID of each of the pictures is set to any one of three types of 0, 1, and 2. In general, when all of the pictures are decoded, the pictures are decoded in order of the 10th picture, the 11th picture, the 12th picture, the 13th picture, the 14th picture, the 15th picture, the 16th picture, the 17th picture, and the 18th picture.

Here, when pictures are thinned out in decoding, it is possible, for example, to skip the pictures of TID=2 without decoding, while the pictures of TID=0 and TID=1 are decoded. The reason for this is that the pictures of TID=0 and TID=1 do not depend on the pictures of TID=2. In this example, the picture of TID=0 and TID=1 do not refer to the 12th picture, the 15th picture, and the 18th picture which are pictures of TID=2

The following describes the above-described TSA picture and the STSA picture.

It is assumed that a decoder which has received a bit stream (image signal) having a plurality of TIDs performs decoding by thinning out some pictures. This decoder is assumed, for example, to decode pictures having TID=0 to TID=N−1, and not to decode pictures having TID=greater than or equal to N. Here, when the decoder has extra processing capacity or the network has extra bandwidth, the decoder decreases the extent of thinning and resumes decoding of pictures having TID=greater than or equal to N. This switching operation is called upswitching.

The TSA picture and the STSA picture are pictures on which the upswitching can be performed.

The TSA picture is a picture that means the following. When the TID of a TSA picture is N, the TSA picture indicates that the TSA picture and a picture which is subsequent in decoding order to the TSA picture and has a TID of greater than or equal to N (restriction-target picture) do not refer to a picture which precedes the TSA picture in decoding order and has a TID of greater than or equal to N (reference-forbidden picture). With this restriction, it is possible to decode the TSA picture and the next picture in decoding order to the TSA picture (TID is greater than or equal to N).

Figure 13:
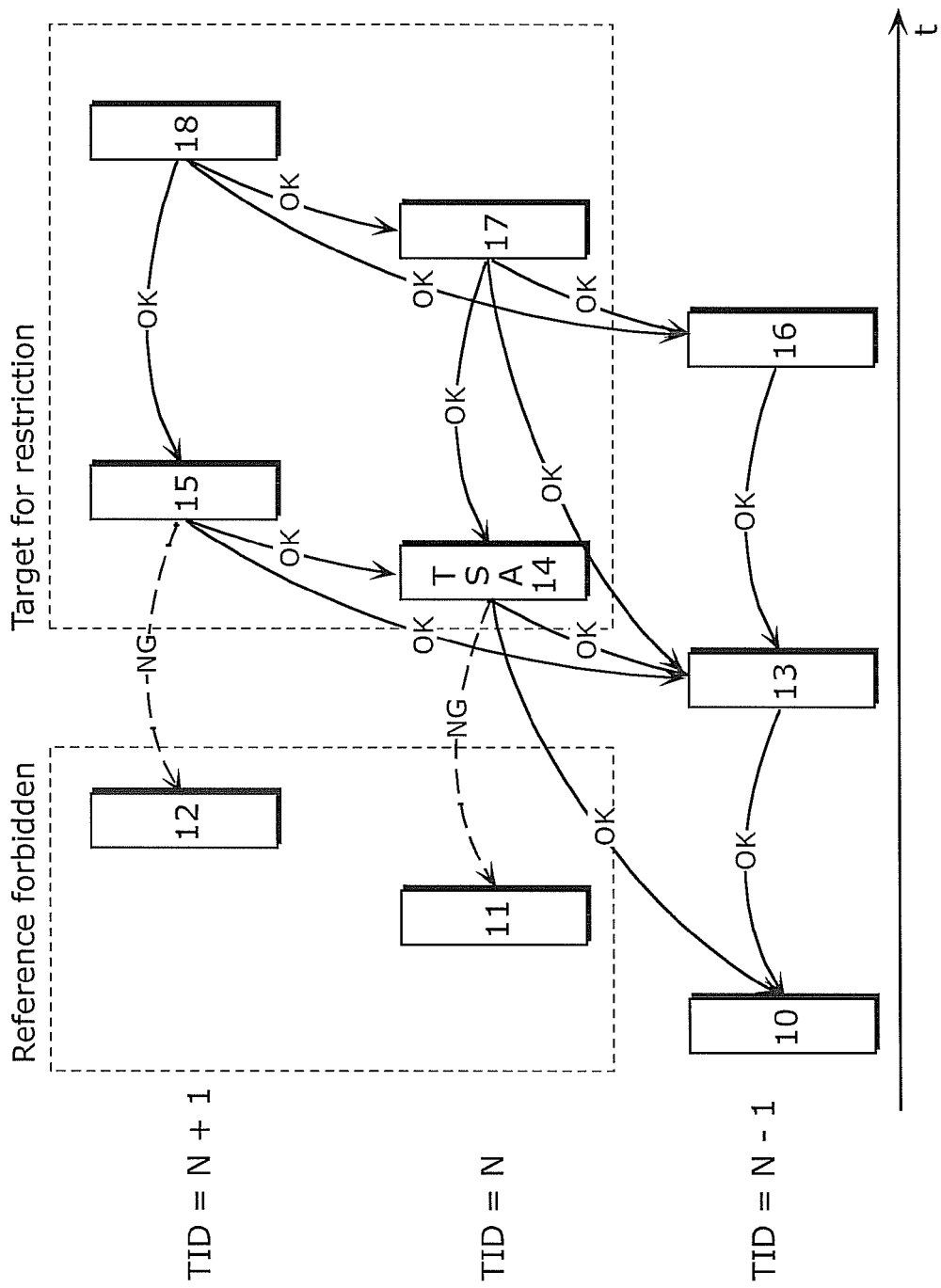
FIG. 13 is a diagram for explaining a TSA picture used in Embodiment 3.

FIG. 13 is a diagram for describing the TSA picture.

For example, the 14th picture in decoding order is a TSA picture, and the TID of the picture indicates that TID=N.

In this example, the restriction-target pictures are the 14th, the 15th, the 17th, and the 18th pictures, and the reference-forbidden picture is the 11th and the 12th pictures. It is assumed, for example, that the decoder has decoded up to the pictures having TID=N−1. In other words, the 10th picture and the 13th picture have been decoded. Here, the 14th picture having TID=N does not depend on the 11th picture or the 12th picture which has not yet been decoded. Accordingly, when it is desired to decode a picture having TIDs greater than or equal to N, the decoder is capable of starting, from the TSA picture, decoding of the pictures having TIDs greater than or equal to N. This means that the decoder is capable of starting decoding of pictures in not only the layer of TID=N in which the TSA picture is present but also layers of greater values. In this example, decoding of the 15th picture can also be started.

STSA picture is a picture having a similar meaning to the TSA picture.

STSA picture is a picture that means the following. STSA picture means that, when a TID of the STSA picture is N, the STSA picture and a picture which is subsequent in decoding order to the STSA picture and has a TID of N (restriction-target picture) do not refer to a picture which precedes the STSA picture in decoding order and has a TID of N (reference-forbidden picture).

Figure 14:
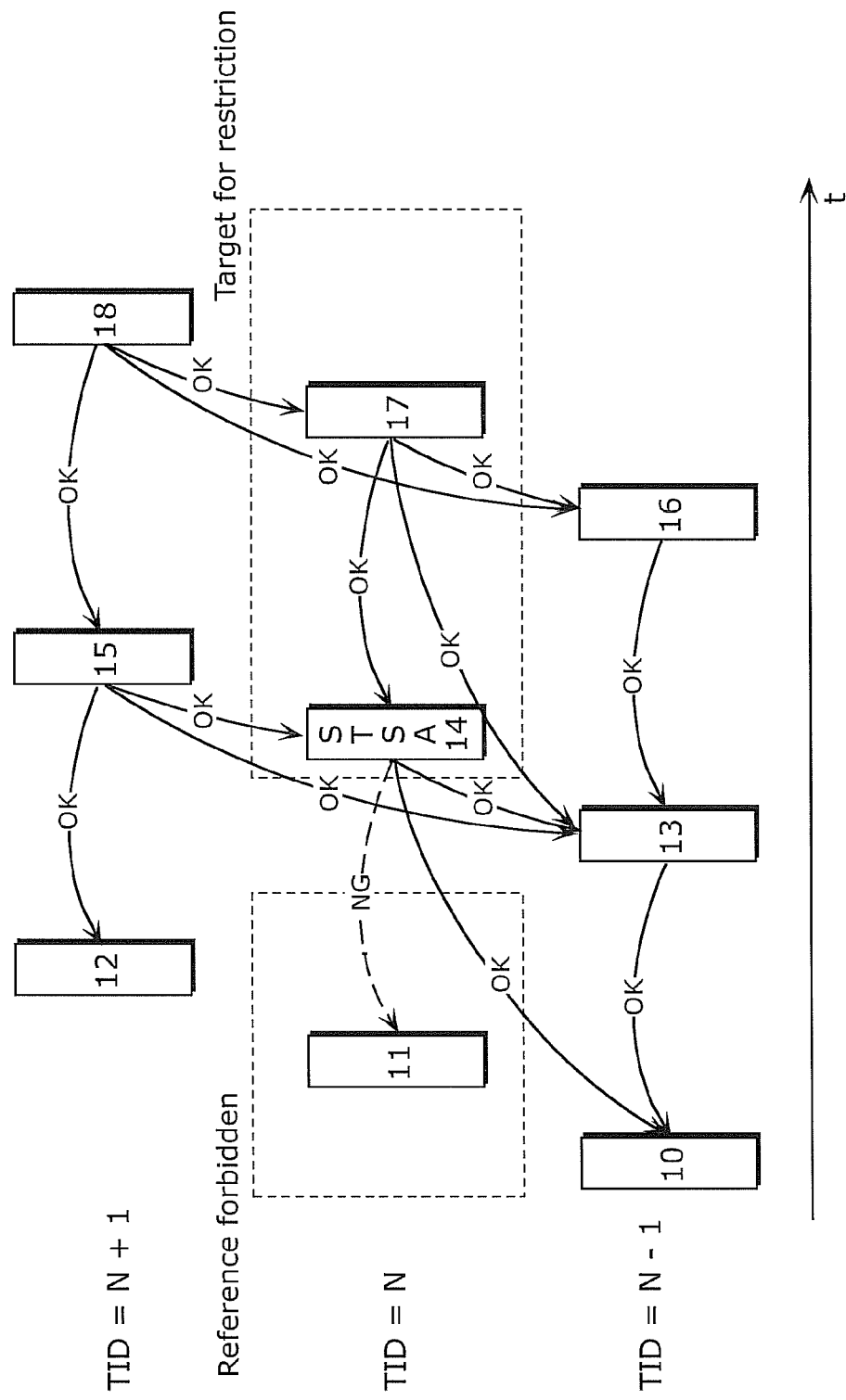
FIG. 14 is a diagram for explaining a STSA picture used in Embodiment 3.

FIG. 14 is a diagram for describing the STSA picture.

In this example, the 14th picture in decoding order is the STSA picture, and the TID of the picture indicates that TID=N. When decoding pictures in the layer of TID=N−1, the decoder is capable of starting, from the 14th STSA picture, decoding of pictures in the layer of TID=N. However, since the STSA picture puts reference restriction only on the layer in which the STSA picture is present, the decoder cannot start decoding of the 15th picture. On the other hand, as to the TSA picture, it is possible to decode the 15th picture as described above.

The following describes comparison between the TSA picture and the STSA picture.

When a TSA picture is present in the layer of TID=N, it is possible to resume decoding from any one of pictures greater than or equal to TID=N subsequent to the TSA picture in decoding order.

On the other hand, when a STSA picture is present in the layer of TID=N, it is possible to resume decoding only from a picture of TID=N subsequent to the STSA picture in decoding order. With the STSA picture, compared to the TSA picture, although upswitching is possible by only one level, decrease in coding efficiency is small because of less strict reference restriction.

Figure 15:
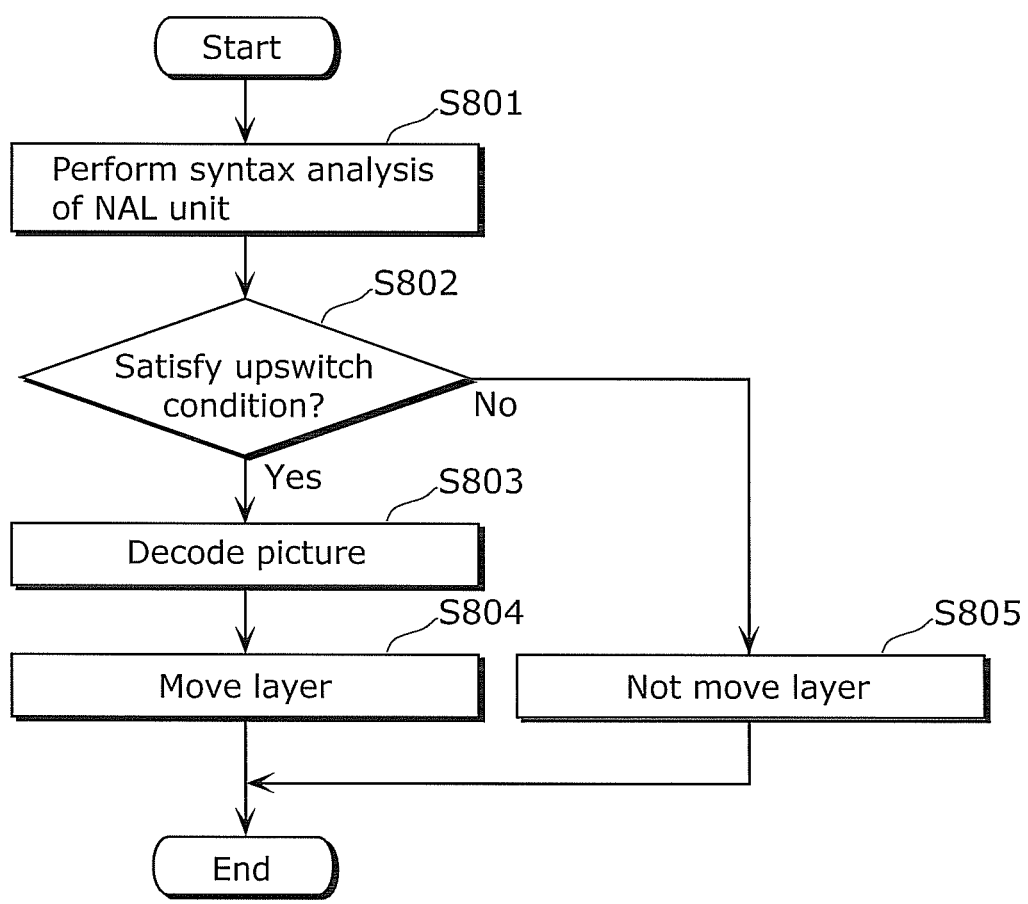
FIG. 15 is a flowchart which illustrates an example of decoding processing performed by a decoder which is the image processing apparatus according to Embodiment 3.

FIG. 15 is a flowchart which illustrates an example of decoding processing performed by a decoder 100 which is the image processing apparatus according to this exemplary embodiment. The case where NAL units in each layer lower than or equal to TID=N−1 have been decoded, and decoding of NAL units in each layer higher than or equal to TID=N is to be started, will be described here as an example.

First, the decoder 100 decodes a NAL unit header of a NAL unit which is a target for processing, and obtains a NAL unit type (NALUT) and a temporal ID (TID) (Step S801).

Next, the decoder 100 checks whether or not the NALUT and the TID satisfy upswitch conditions (Step S802). More specifically, the decoder 100 checks whether or not the NALUT is TSA or STSA. When the NALUT is TSA, the decoder 100 further checks whether or not the TID is greater than or equal to N. When the NALUT is STSA, the decoder 100 further checks whether or not the TID is N.

When the upswitch condition that (i) the NALUT is TSA and the TID is greater than or equal to N or (ii) the NALUT is STSA and the TID is N is satisfied (Yes in Step S802), the decoder 100 decodes a target picture corresponding to the target NAL unit (Step S803), and a picture of TID=N which is subsequent to the target picture in decoding order is also a target for decoding (Step S804). In other words, the decoder 100 performs layer movement, thereby including, into a decoding target, a layer in which the target picture is present.

It is to be noted that, when the NALUT is TSA and the TID of a picture on which decoding is performed subsequently to the TSA picture is larger than N, the decoder 100 includes the layer of the picture into a target decoded subsequently.

On the other hand, when the NALUT and the TID included in the NAL unit header do not satisfy the upswitch conditions (No in Step S802), the decoder 100 does not perform layer movement, and as a result, does not include, into a decoding target, a layer of a target picture corresponding to the target NAL unit (Step S805). Then, the decoder 100 performs determining processing (Step S801 and Step S802), in the same manner, on a subsequent picture, as necessary.

As described above, it is possible to perform decoding processing which involves upswitching, with a simple configuration.

Here, in the case of the decoding processing exemplified by the flowchart in FIG. 15, there is a possibility that upswitching cannot be performed due to an error occurring in a bit stream.

Figure 16:
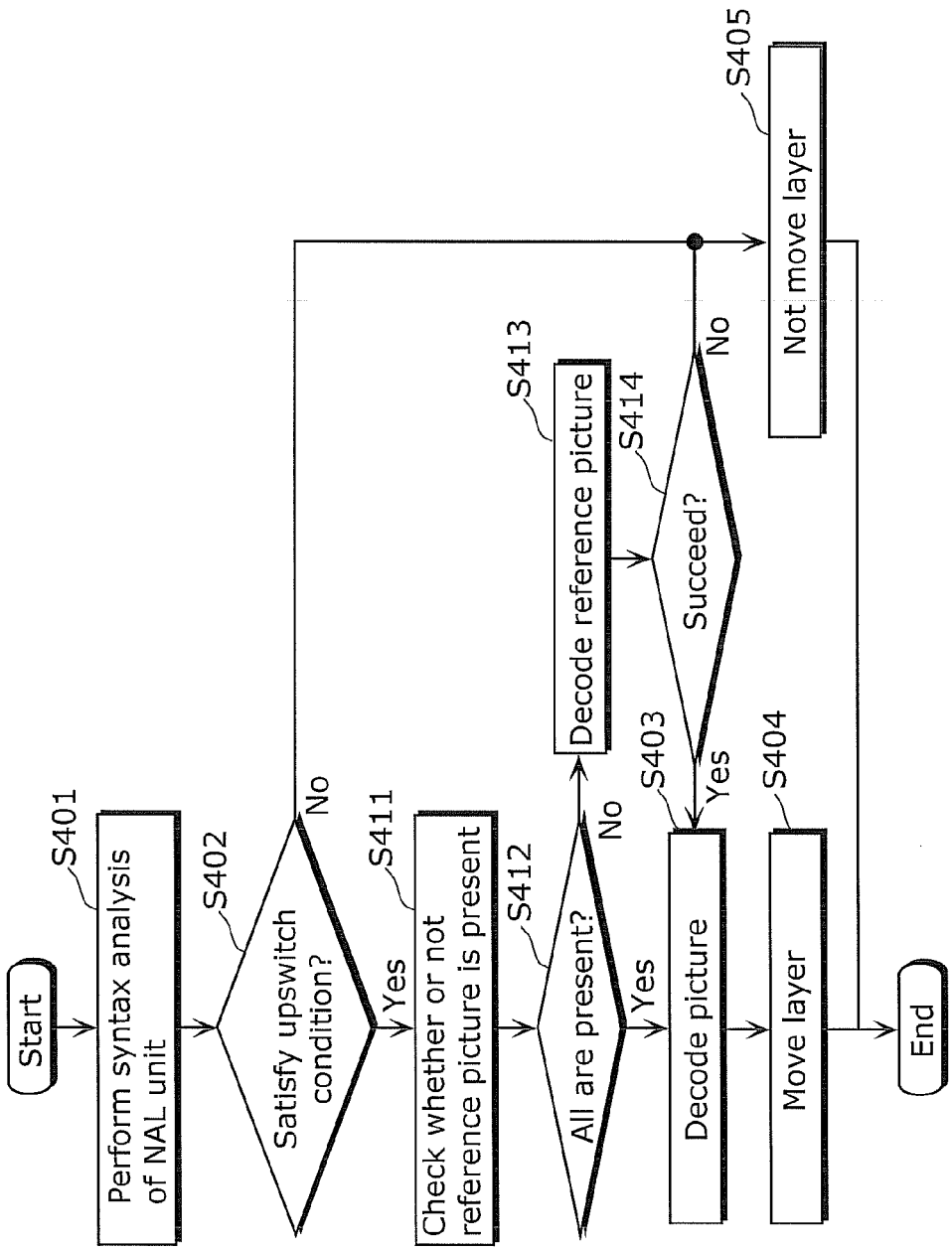
FIG. 16 is a flowchart which illustrates an example of decoding processing performed by a decoder which is the image processing apparatus according to Embodiment 3.

In view of the above, the decoder 100 which is an image processing apparatus according to this exemplary embodiment may perform decoding processing as illustrated in FIG. 16.

FIG. 16 is a flowchart which illustrates an example of decoding processing performed by the decoder 100 which is the image processing apparatus according to this exemplary embodiment. The case where NAL units in each layer lower than or equal to TID=N−1 have been decoded, and decoding of NAL units in each layer higher than or equal to TID=N is to be started, will be described here as an example.

First, the NAL unit syntax analysis unit 103 of the decoder 100 decodes a NAL unit header of a NAL unit which is a target for processing, in the same manner as in Step S801 illustrated in FIG. 15, and obtains a NAL unit type (NALUT) and a temporal ID (TID) (Step S401).

Next, the NAL unit syntax analysis unit 103 checks whether or not the NALUT and the TID satisfy upswitch conditions in the same manner as in Step S802 illustrated in FIG. 15 (Step S102). More specifically, the NAL unit syntax analysis unit 103 checks whether or not the NALUT is one of TSA and STSA. When the NALUT is TSA, the NAL unit syntax analysis unit 103 further checks whether or not the TID is greater than or equal to N. When the NALUT is STSA, the NAL unit syntax analysis unit 103 further checks whether or not the TID is N When the upswitch condition that (i) the NALUT is TSA and the TID is greater than or equal to N or (ii) the NALUT is STSA and the TID is N is satisfied (Yes in Step S402), the data decoding unit 104 of the decoder 100, for each reference picture which is referred to by a target picture corresponding to the target NAL unit, decodes the number of the reference picture, and checks whether or not a reference picture having the number is present in the DPB buffer 105 (Step S411). Then, the data decoding unit 104 checks whether each of the reference pictures are all present in the DPB buffer 105 (Step S412).

When all of the reference pictures are present in the DPB buffer 105 (Yes in Step S412), the data decoding unit 104 decodes the target picture in the same manner as in Step S803 illustrated in FIG. 15 (Step S403). In addition, the data decoding unit 104 determines that a picture of TID=N which is subsequent to the target picture in decoding order is also a target for decoding, in the same manner as in Step S804 illustrated in FIG. 15 (Step S404). In other words, the data decoding unit 104 includes a layer in which the target picture is present into the decoding target. It is to be noted that, when the NALUT is TSA and the TID of a picture on which decoding is performed subsequently to the TSA picture is larger than N, the data decoding unit 104 includes the layer of the picture into a target to be decoded subsequently.

On the other hand, when at least one reference picture is not present in the DPB buffer 105 (No in Step S412), the data decoding unit 104 decodes the reference picture which is not present (Step S413). For example, when a bit stream (NAL unit) related to the reference picture which is not present is present in a local memory (the CPB buffer 102, for example), the data decoding unit 104 decodes an encoded reference picture in a bit stream stored in the CPB buffer 102. When the decoder 100 is receiving a bit stream via a network and an encoded reference picture is not present in a local memory, the data decoding unit 104 may request a server which is transmitting the bit stream to transmit the reference picture. Alternatively, the data decoding unit 104 may decode, as an alternative of the above-described reference picture, a picture which is temporally close to the target picture among decodable bit streams. Or, the data decoding unit 104 may use, as an alternative of a decoded reference picture, a decoded picture which is stored in the DPB buffer 105 and is temporally closest to the target picture.

Next, the data decoding unit 104 checks whether or not decoding of a reference picture has succeeded (Step S414). When the decoding has succeeded (Yes in Step S414), the data decoding unit 104 decodes the target picture (Step S403). On the other hand, when the data decoding unit 104 fails decoding of even one reference picture (No in Step S414), the data decoding unit 104 does not perform layer movement in the same manner as in Step S805 illustrated in FIG. 15, and as a result, does not include a layer of the target picture corresponding to the target NAL unit into the decoding target (Step S405). It is to be noted that, in Step S405, even when an image decoded halfway is present, this image is neither stored in the DPB buffer 105 nor displayed.

In addition, when the NALUT and the TID included in the NAL unit header do not satisfy the upswitch condition (No in Step S402), the decoder 100 does not perform layer movement for the target picture in the same manner as above (Step S405).

It is to be noted that, when a picture which satisfies the upswitch condition is present next in decoding order, upswitching may be retried for the picture. When the retry is repeated more than predetermined times, or a waiting interval from trying the upswitching operation to an actual execution exceeds more than a predetermined time, the decoder 100 may notify of an error signal to an external means (a control system or a user interface of a system layer) which issued the instruction of upswitching. The external means which has received the error signal may notify or display the failure of upswitching using a drawing means. Alternatively, the external means may perform an abnormal time operation (for example, displaying a message on a display screen, causing an apparatus to vibrate, and so on) using a user interface.

As described above, the decoder 100 according to an aspect of the present disclosure is capable of providing a method of upswitching, and further decoding a bit stream even when an error is occurring in the bit stream and a reference picture is not present in the DPB buffer 105.

In sum, according to this exemplary embodiment, an image signal includes a plurality of NAL units which are signal units, pictures each corresponding to a different one of the NAL units are classified into any one of a plurality of layers, and a target picture is encoded without referring to a picture which belongs to a layer in a higher level than a layer to which the target picture belongs. In obtaining of a NAL unit type according to this exemplary embodiment, a NAL unit type is obtained which is a NAL unit type included in a NAL unit corresponding to a target picture to be processed among a plurality of pictures, and which defines forbidding a reference relation in which the target picture refers to a specific picture which belongs to the same layer as the target picture. In the image processing method according to this exemplary embodiment, when a restriction is imposed on a layer to which a picture to be decoded among a plurality of pictures belongs, it is further determined whether or not upswitching for alleviating the restriction on the layer can be performed on the target picture, based on the obtained NAL unit type and the layer to which the target picture belongs. In executing the restriction alleviation processing according to this exemplary embodiment, when it is determined that the upswitching can be performed, whether or not the above-described specific picture which is a reference picture to which the target picture refers is stored in the DPB buffer 105 is determined. When it is found that the specific picture is not stored in the DPB buffer 105 as a result of the determination, the reference picture is decoded, and the target picture is decoded by performing referring to the reference picture which is forbidden by the above-described NAL unit type.

There is the case, for example, where a NAL unit type such as TSA or STSA which forbids a reference relation in which a specific picture is referred to, in spite of the fact that a target picture refers to the specific picture, is falsely included in a NAL unit. In such a case, since the specific picture is not stored in the DPB buffer 105, the target picture cannot refer to the specific picture in performing of upswitching, in some cases. In view of the above, when a specific picture is not stored in the DPB buffer 105 as a reference picture, since the reference picture is decoded and alleviation allows referring to the reference picture which is forbidden by the NAL unit type as described above, it is possible to properly decode the target picture.

Next, the temporal nesting flag (Temporal_Nesting_Flag) will be explained.

FIG. 17A to FIG. 17D are diagrams for explaining a temporal nesting flag.

As illustrated in FIG. 17A to FIG. 17D, when a temporal nesting flag is true (Temporal_Nesting_Flag=1), depending on the relation of TID between two arbitrary pictures pic B and pic C which precede a picture pic A in decoding order, reference to the picture pic B by the picture pic A is restricted.

Figure 17A:
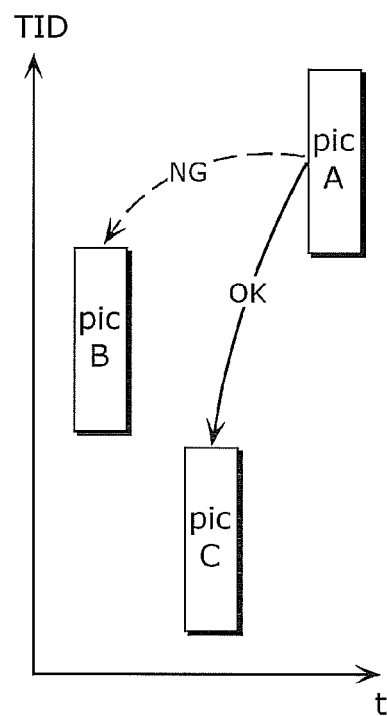
FIG. 17A is a diagram for explaining a temporal nesting flag used in Embodiment 3.
Figure 17B:
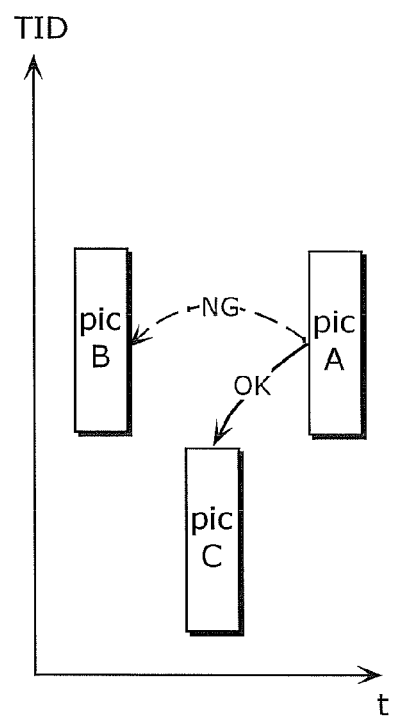
FIG. 17B is a diagram for explaining the temporal nesting flag used in Embodiment 3.
Figure 17C:
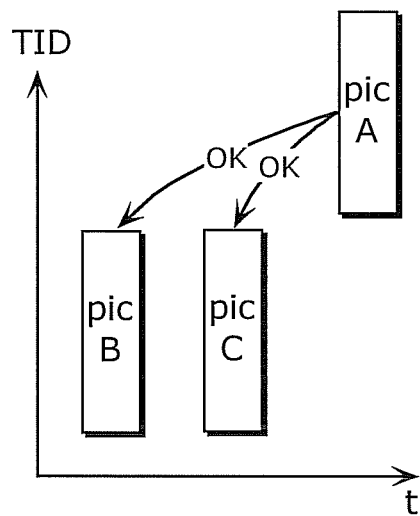
FIG. 17C is a diagram for explaining a temporal nesting flag used in Embodiment 3.
Figure 17D:
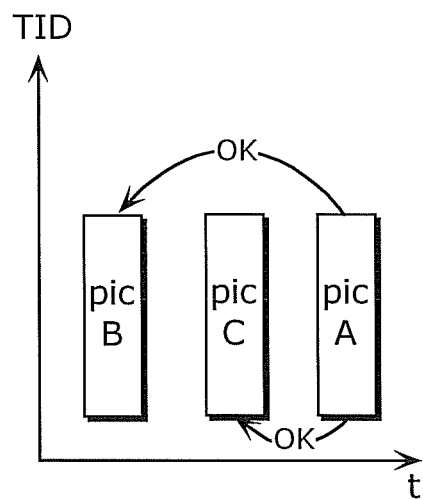
FIG. 17D is a diagram for explaining a temporal nesting flag used in Embodiment 3.

To be specific, the decoding order between the pictures pic A to pic C is the picture pic B, the picture pic C, the picture pic A. As illustrated in FIG. 17A and FIG. 17B, when the temporal nesting flag is true and the TID of the picture pic C is smaller than the TID of the picture pic B, restriction is imposed on reference to the picture pic B which precedes the picture pic C in decoding order. It is to be noted that, even when the temporal nesting flag is true as illustrated in FIG. 17C and FIG. 17D, reference to the picture pic B is not restricted when the TID of the picture pic C and the TID of the picture pic B are the same.

Here, there is sometimes the case where an error occurs that a reference structure between pictures is not restricted in spite of the fact that a temporal nesting flag of true is set. In other words, also in this case, there is the case where, in decoding of a target picture, a reference picture to which the target picture refers is not present in the DPB buffer 105.

Figure 18:
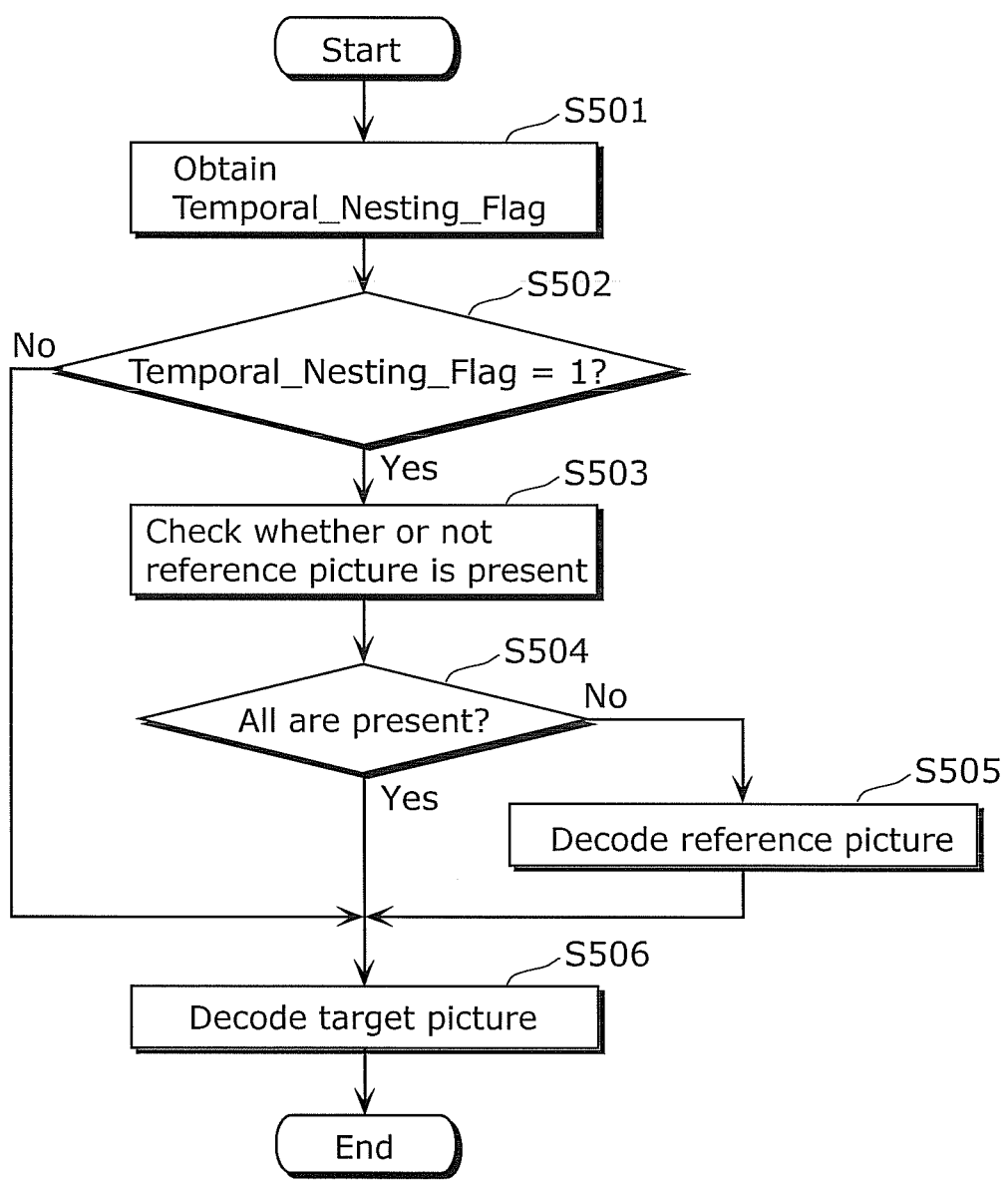
FIG. 18 is a flowchart which illustrates another example of decoding processing performed by the decoder which is the image processing apparatus according to Embodiment 3.

FIG. 18 is a flowchart which illustrates an example of decoding processing performed by the decoder 100 which is the image processing apparatus according to this exemplary embodiment.

First, the data decoding unit 104 of the decoder 100 decodes a video parameter set (VPS) or a sequence parameter set (SPS) included in a bit stream, and obtains a temporal nesting flag therefrom (Step S501).

Then, the data decoding unit 104 determines whether or not the temporal nesting flag is true (1) (Step S502). Here, when it is determined that the temporal nesting flag is true (Yes in Step S502), the data decoding unit 104 decodes, for each of the reference pictures referred to by a target picture to be processed which corresponds to the temporal nesting flag, the number of the reference picture, and checks whether a reference picture having the number is present in the DPB buffer 105 (Step S503). Then, the data decoding unit 104 determines, for each of the reference pictures, whether the reference pictures are all present in the DPB buffer 105 (Step S504).

When it is determined that all of the reference pictures are present in the DPB buffer 105 (Yes in Step S504), the data decoding unit 104 decodes the target picture (Step S506). On the other hand, when it is determined that at least one reference picture is not present in the DPB buffer 105 (No in Step S504), the data decoding unit 104 decodes the reference picture which is not present in the DPB buffer 105 in the same manner as in Step S413 illustrated in FIG. 16. For example, when a bit stream related to the reference picture which is not present is included in the CPB buffer 102, the data decoding unit 104 decodes an encoded reference picture in the bit stream stored in the CPB buffer 102. When the decoder 100 is receiving a bit stream via a network and the encoded reference picture is not present in the CPB buffer 102, the data decoding unit 104 may request a server which is transmitting the bit stream to transmit the reference picture. Alternatively, the data decoding unit 104 may decode, as an alternative of the above-described reference picture, a picture which is temporally close to the target picture among decodable bit streams. Or, the data decoding unit 104 may use, as an alternative of a decoded reference picture, a decoded picture which is stored in the DPB buffer 105 and is temporally close to the target picture.

Next, the data decoding unit 104 decodes a target picture by referring to a reference picture in the DPB buffer 105 or the reference picture which is decoded in Step S505 (Step S506).

With the image processing method according to this exemplary embodiment, a target picture can be decoded by referring to a reference picture when the reference picture is present in the DPB buffer 105, and even when the reference picture is not present in the DPB buffer 105, the reference picture is trace-backed to and decoded, thereby allowing decoding even in more error cases.

In other words, according to this exemplary embodiment, a plurality of pictures are each classified into any one of a plurality of layers, and encoded without referring to a picture which belongs to a higher level layer than a layer to which the picture belongs. Furthermore, according to this exemplary embodiment, a temporal nesting flag which forbids referring to, in a predetermined state, by a target picture to be processed among a plurality of pictures, a lower level picture which belongs to a layer in a lower level than a layer to which the target picture belongs, is obtained as a parameter. In addition, in executing of the restriction alleviation processing according to this exemplary embodiment, it is determined whether or not a lower level picture is stored in the DPB buffer 105. Here, when it is determined that the lower level picture is not stored in the DPB buffer 105, the lower level picture is decoded, and the target picture is decoded by referring to the decoded lower level picture without complying with the temporal nesting flag.

There is the case, for example, a temporal nesting which forbids referring to a lower level picture in spite of the fact that a target picture refers to the lower level picture is falsely included in an image signal. In such a case, the target picture cannot refer to the lower level picture because the lower level picture is not stored in the DPB buffer 105. In view of the above, when a lower level picture is not stored in the DPB buffer 105, since the lower level picture is decoded and alleviation allows referring to the lower level picture which is forbidden by the temporal nesting as described above, it is possible to properly decode the target picture.

Although the image processing method and image processing apparatus according to one or more aspects have been described based on each of exemplary embodiments and modifications, the present disclosure also includes, for example, other aspects as below.

Figure 19A:
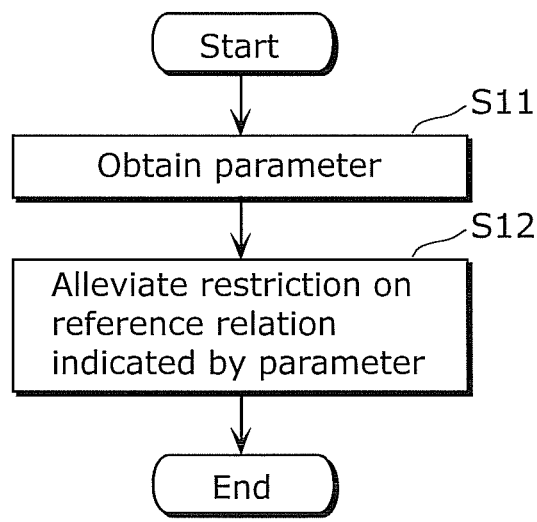
FIG. 19A is a flowchart which illustrates an image processing method according to an aspect of the present disclosure.

FIG. 19A is a flowchart which illustrates an image processing method according to an aspect of the present disclosure.

The image processing method is an image processing method for processing an image signal generated by encoding a plurality of pictures, and includes execution of the processes of Step S11 and Step S12. In Step S11, a parameter which indicates restriction on a reference relation between at least one of a plurality of pictures and an other one of the plurality of pictures in encoding is obtained from the image signal. Next, in Step S12, restriction alleviation processing for alleviating the restriction on the reference relation indicated by the parameter is performed.

Figure 19B:
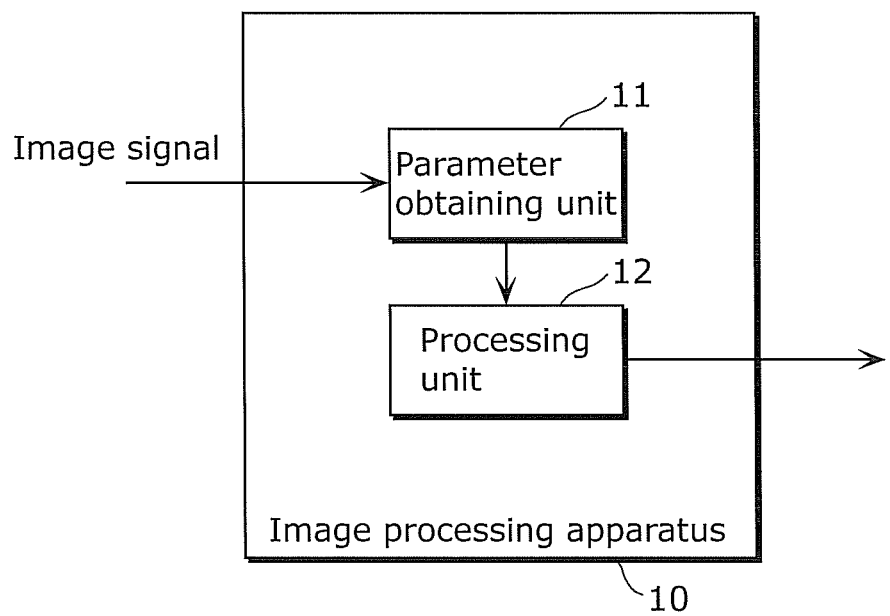
FIG. 19B is a block diagram which illustrates a configuration of the image processing apparatus according to an aspect of the present disclosure.

FIG. 19B is a block diagram which illustrates a configuration of the image processing apparatus according to an aspect of the present disclosure.

An image processing apparatus 10 is an image processing apparatus which processes an image signal generated by encoding a plurality of pictures, and includes a parameter obtaining unit 11 an a processing unit 12.

The parameter obtaining unit 11 obtains, from the image signal, a parameter which indicates restriction on a reference relation between at least one of a plurality of pictures and an other one of the plurality of pictures in encoding. The processing unit 12 performs restriction alleviation processing for alleviating the restriction indicated by the parameter.

With the image processing method and the image processing apparatus according to an aspect of the present disclosure as described above, the advantageous effects equivalent to the above-described Embodiments and modifications are produced. In other words, with the above-described one aspect, even when restriction on a reference relation indicated by a parameter is falsely strict because the parameter such as a NAL unit type or a temporal nesting flag is incorrect, the restriction on the reference relation is alleviated. It is therefore possible to prevent an error from occurring due to inconsistency that occurs between the restriction on the reference relation indicated by the parameter and an actual reference relation between image signals (relation indicated by the number of a reference picture, or the like) or a reference relation indicated by another parameter (different NAL unit type). Thus, it is possible to prevent decoding on an image signal from ending due to an error, for example.

Each of the structural elements in each of the above-described embodiments and modifications may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software for realizing the image processing apparatus or the like according to each of the embodiments and modifications is a program which executes the processing of each of the steps in the flowchart illustrated in FIG. 19A. Although the image processing method and image processing apparatus according to one or more aspects have been described based on each of exemplary embodiments and modifications, the scope of the present disclosure is not limited to these embodiments and modifications. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

Embodiment 4

The processing described in each of embodiments can be simply implemented in an independent computer system, by recording, in a recording medium, one or more programs for implementing the configurations of the moving picture encoding method (image encoding method) and the moving picture decoding method (image decoding method, image processing method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method, image processing method) described in each of embodiments and systems using thereof will be described. The system has a feature of having an image coding apparatus that includes an image encoding apparatus using the image encoding method and an image decoding apparatus (image processing apparatus) using the image decoding method (image processing method). Other configurations in the system can be changed as appropriate depending on the cases.

FIG. 20 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 20, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present disclosure), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image processing apparatus or the image decoding apparatus according to an aspect of the present disclosure).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 21:
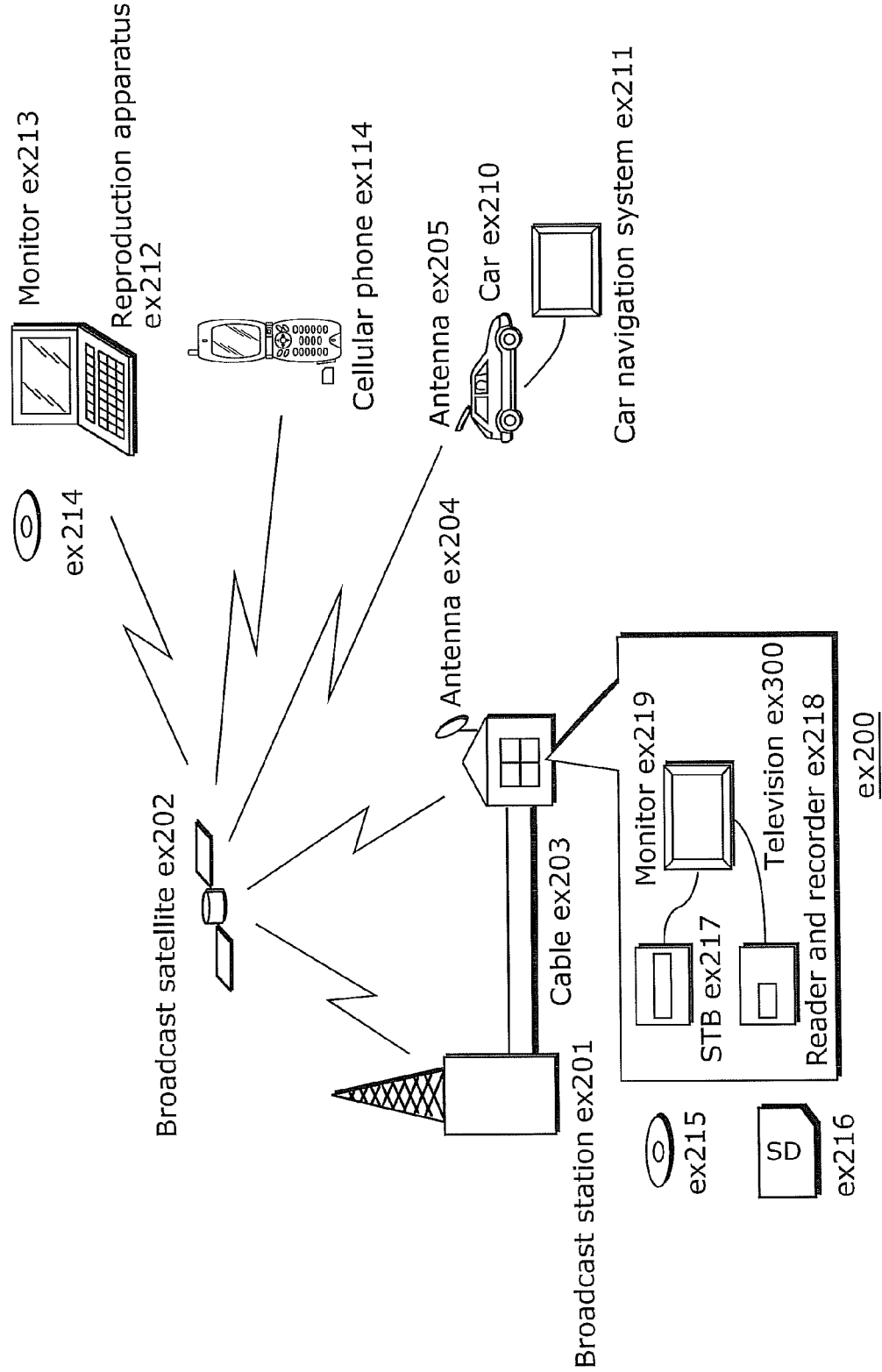
FIG. 21 shows an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 21. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus, image processing apparatus according to an aspect of the present disclosure).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 22:
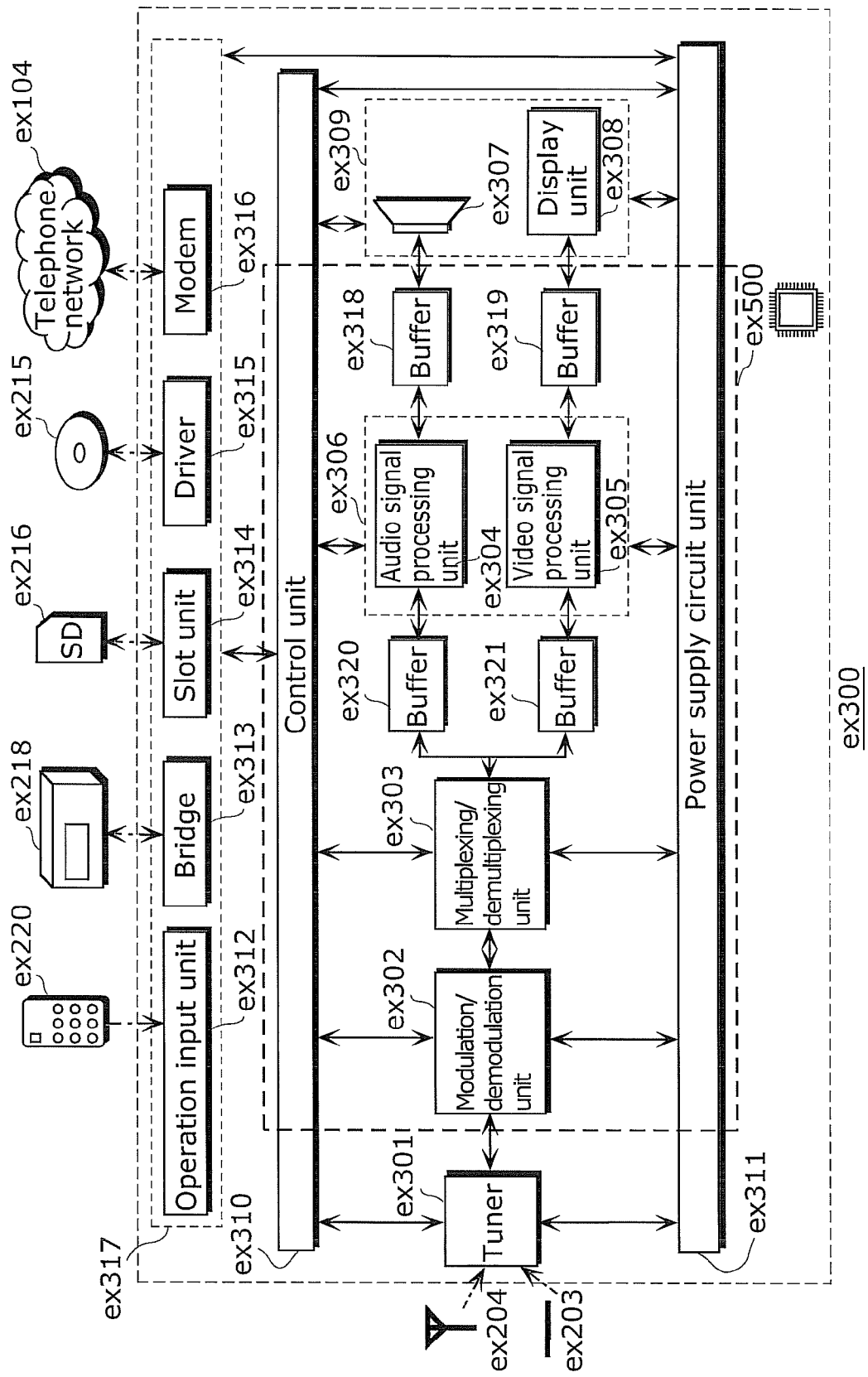
FIG. 22 shows a block diagram illustrating an example of a configuration of a television.

FIG. 22 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 23:
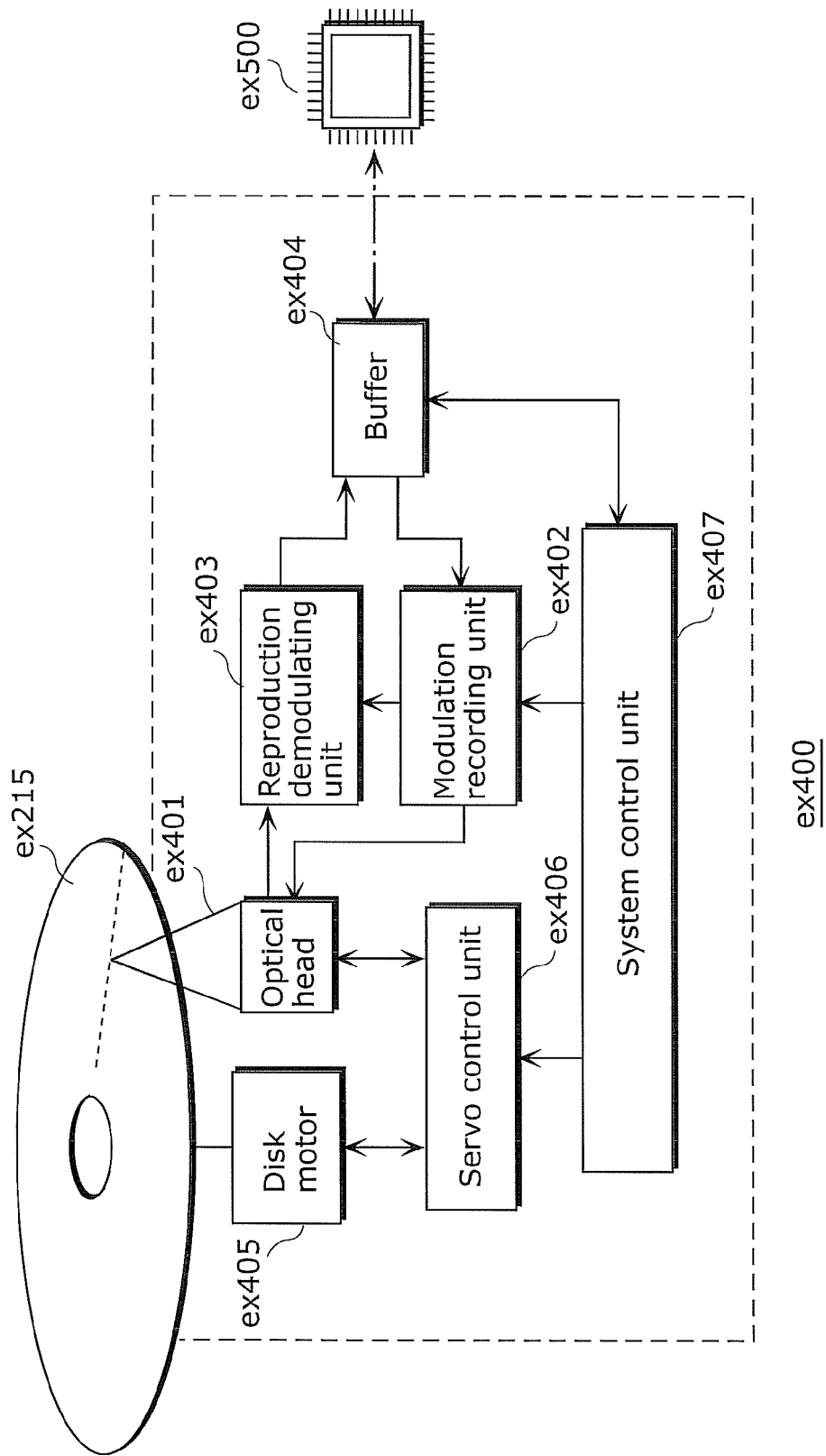
FIG. 23 shows a block diagram illustrating an example of a configuration of an information reproducing/recording unit that reads and writes information from and on a recording medium that is an optical disk.

As an example, FIG. 23 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 24:
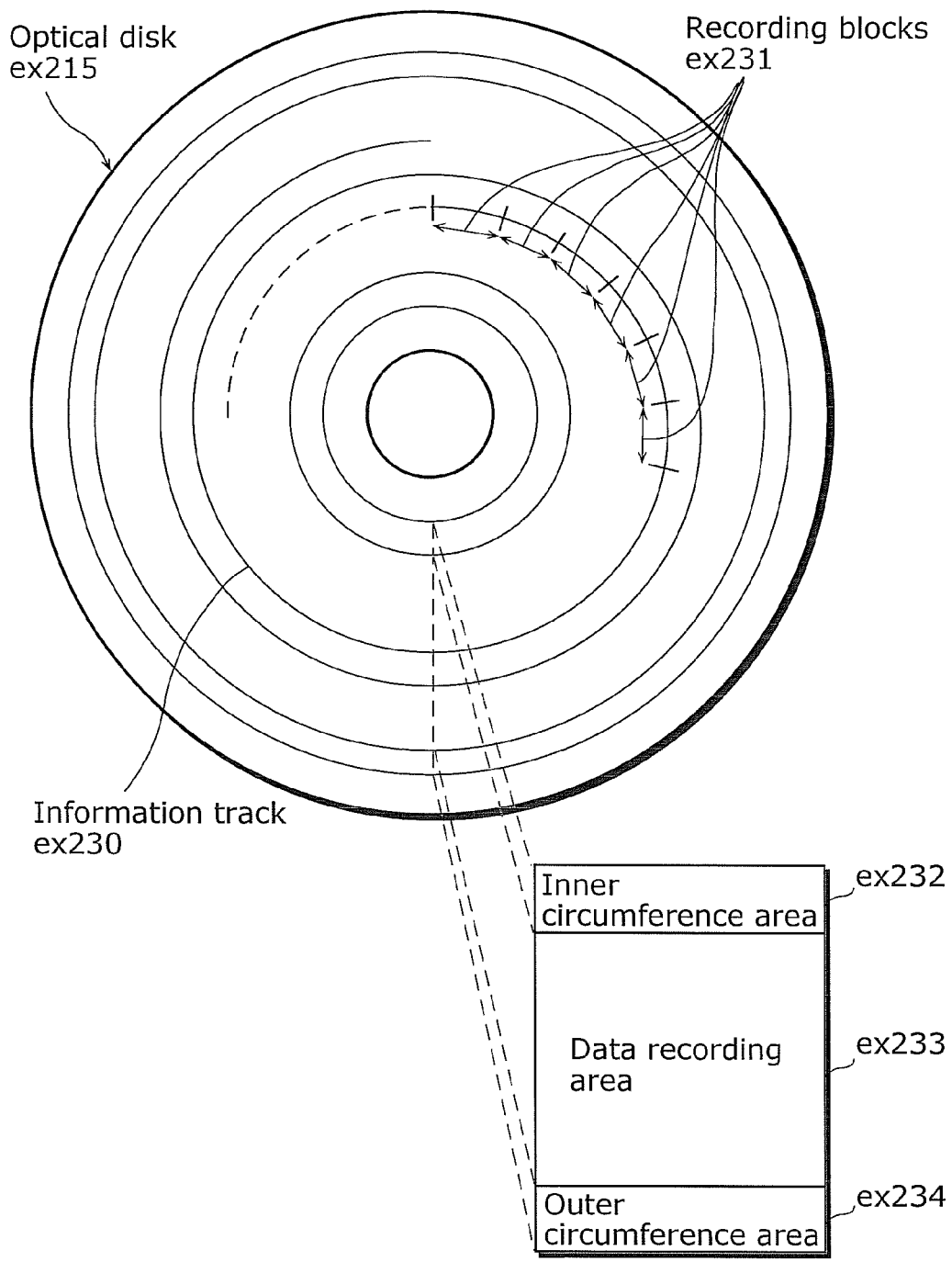
FIG. 24 shows an example of a configuration of a recording medium that is an optical disk.

FIG. 24 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 22. The same will be true for the configuration of the computer ex111, the cellular phone ex114, and others.

Figure 25A:
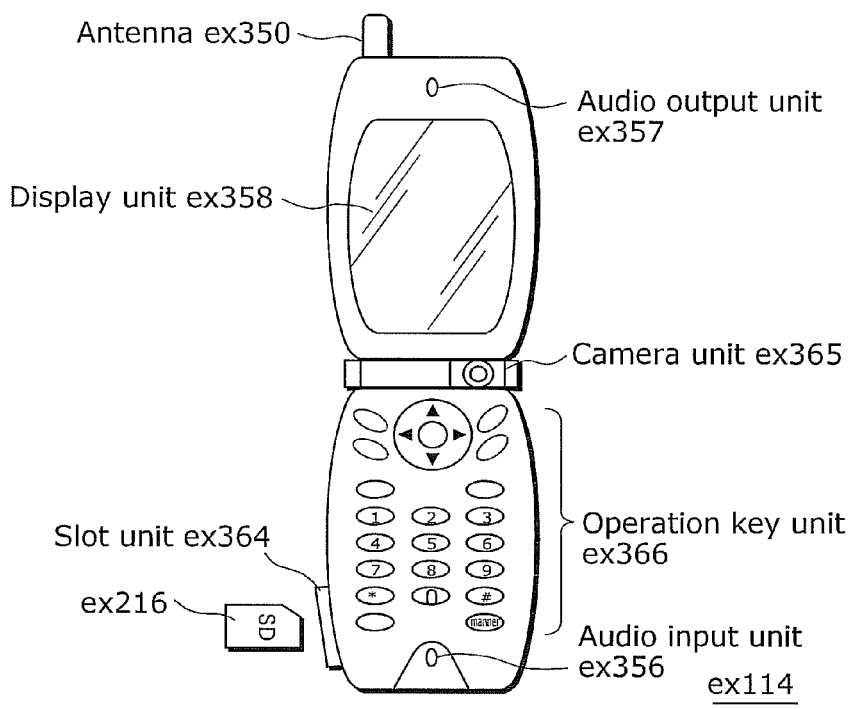
FIG. 25A shows an example of a cellular phone.

FIG. 25A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 25B:
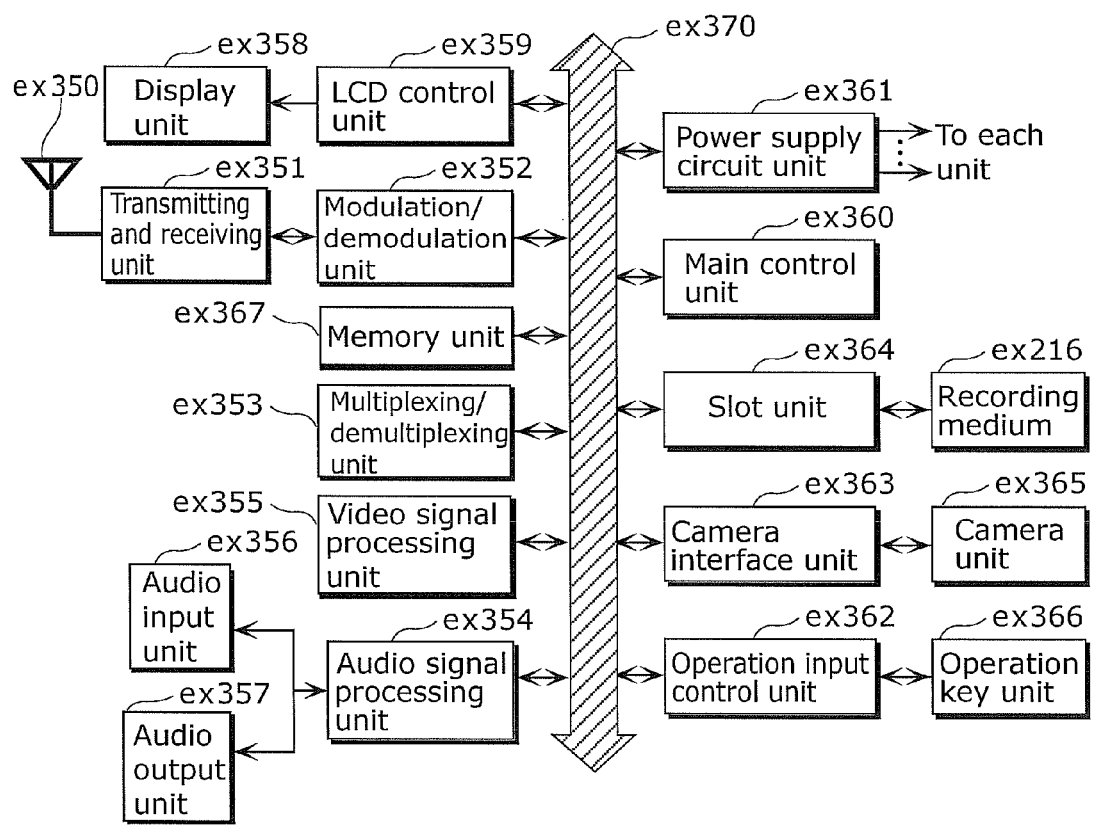
FIG. 25B is a block diagram showing an example of a configuration of a cellular phone.

Next, an example of a configuration of the cellular phone ex114 will be described with reference to FIG. 25B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present disclosure), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image processing apparatus or image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, various modifications and revisions can be made in any of the embodiments in the present disclosure.

Furthermore, the present disclosure is not limited to the aforementioned Embodiments, and various modifications and revisions are possible without departing from the scope of the present disclosure.

Embodiment 5

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, an appropriate decoding method cannot be selected.

In view of this, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 26 illustrates a structure of the multiplexed data. As illustrated in FIG. 26, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 27:
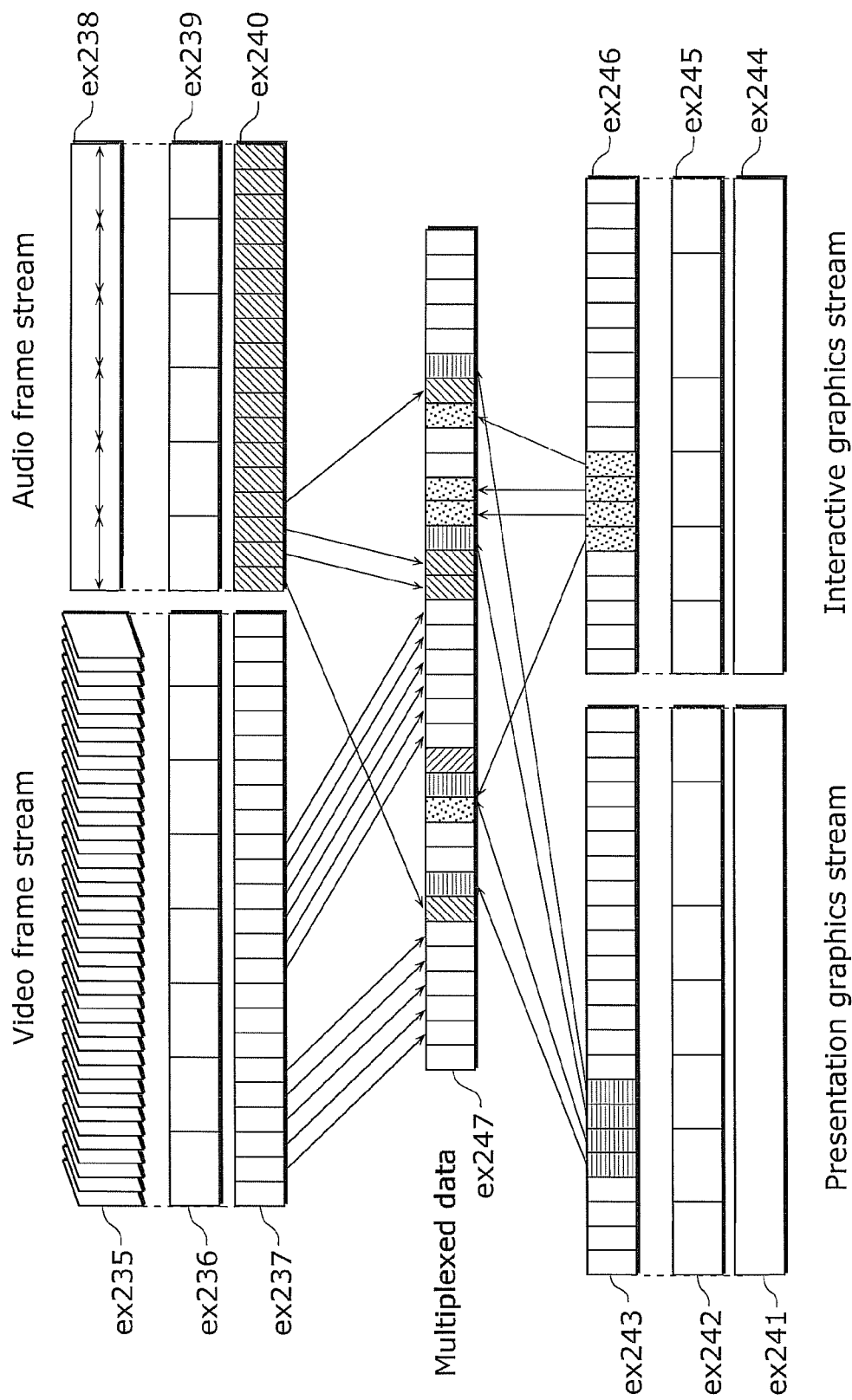
FIG. 27 schematically shows how each stream is multiplexed in multiplexed data.

FIG. 27 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 28:
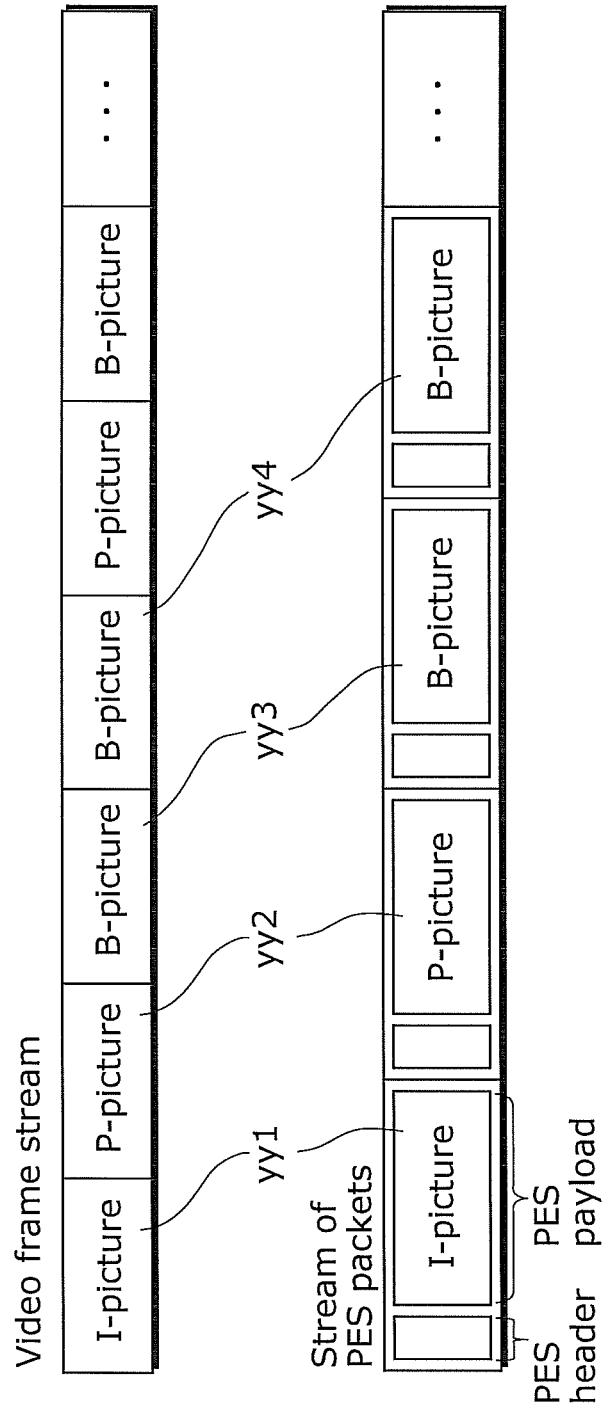
FIG. 28 shows how a video stream is stored in a stream of PES packets in more detail.

FIG. 28 illustrates how a video stream is stored in a stream of PES packets in more detail. The first bar in FIG. 28 shows a video frame stream in a video stream. The second bar shows the stream of PES packets. As indicated by arrows denoted as yy1, yy2, yy3, and yy4 in FIG. 28, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 29 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 29. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 30:
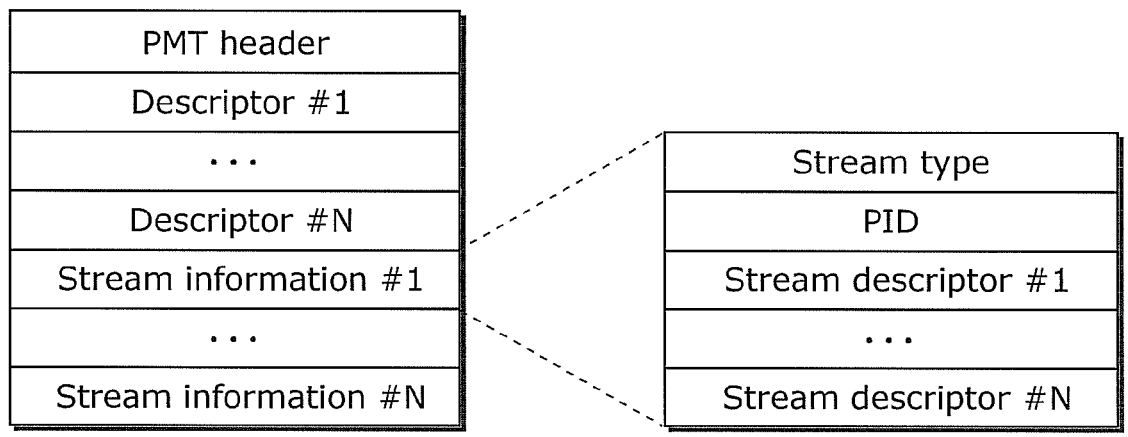
FIG. 30 shows a data structure of a PMT.

FIG. 30 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 31:
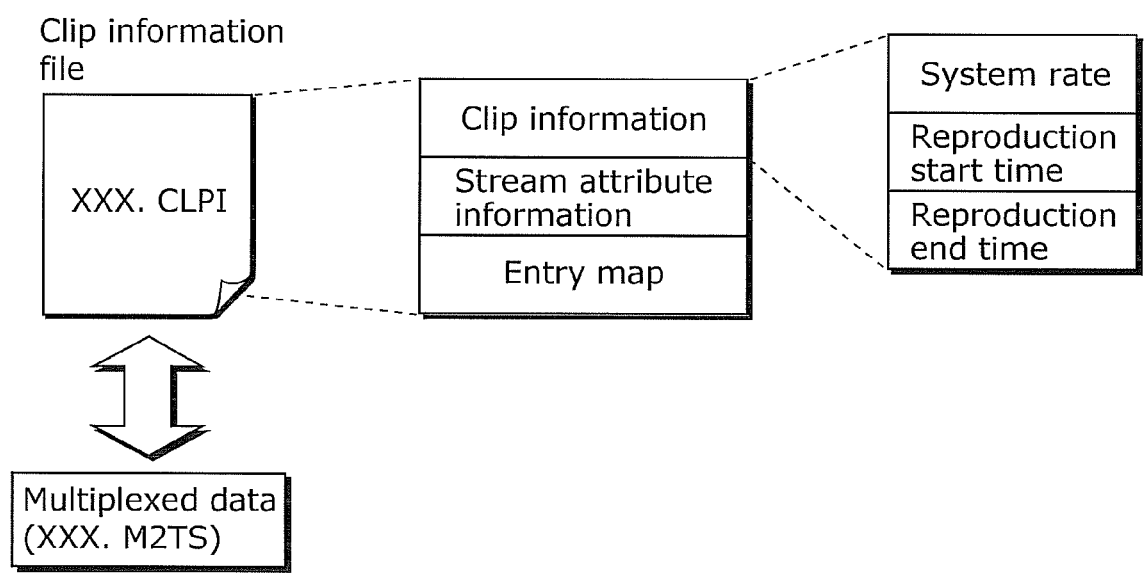
FIG. 31 shows an internal structure of multiplexed data information.

Each of the multiplexed data information files is management information of the multiplexed data as shown in FIG. 31. The multiplexed data information files are in one to one correspondence with the multiplexed data, and each of the files includes multiplexed data information, stream attribute information, and an entry map.

As illustrated in FIG. 31, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 32:
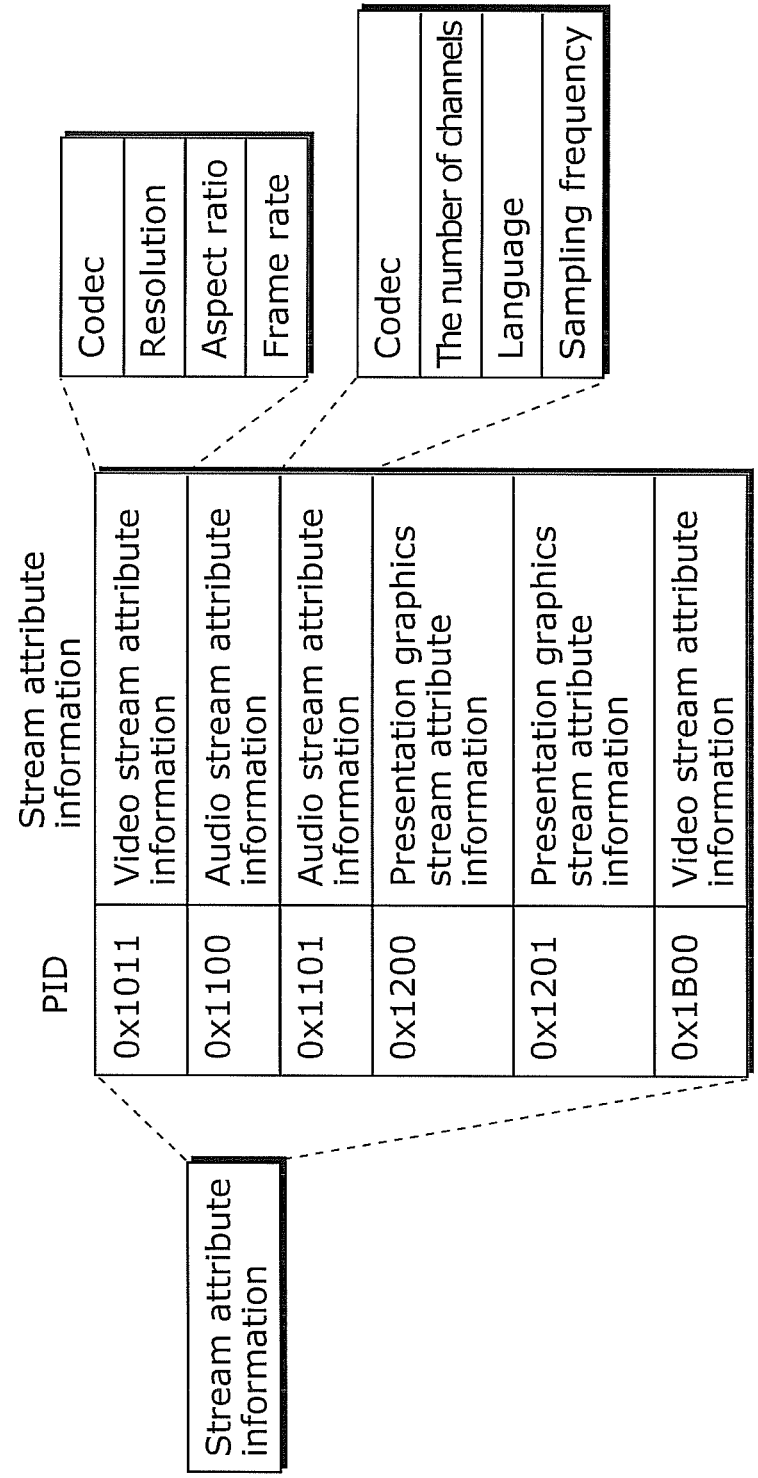
FIG. 32 shows an internal structure of stream attribute information.

As shown in FIG. 32, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 33:
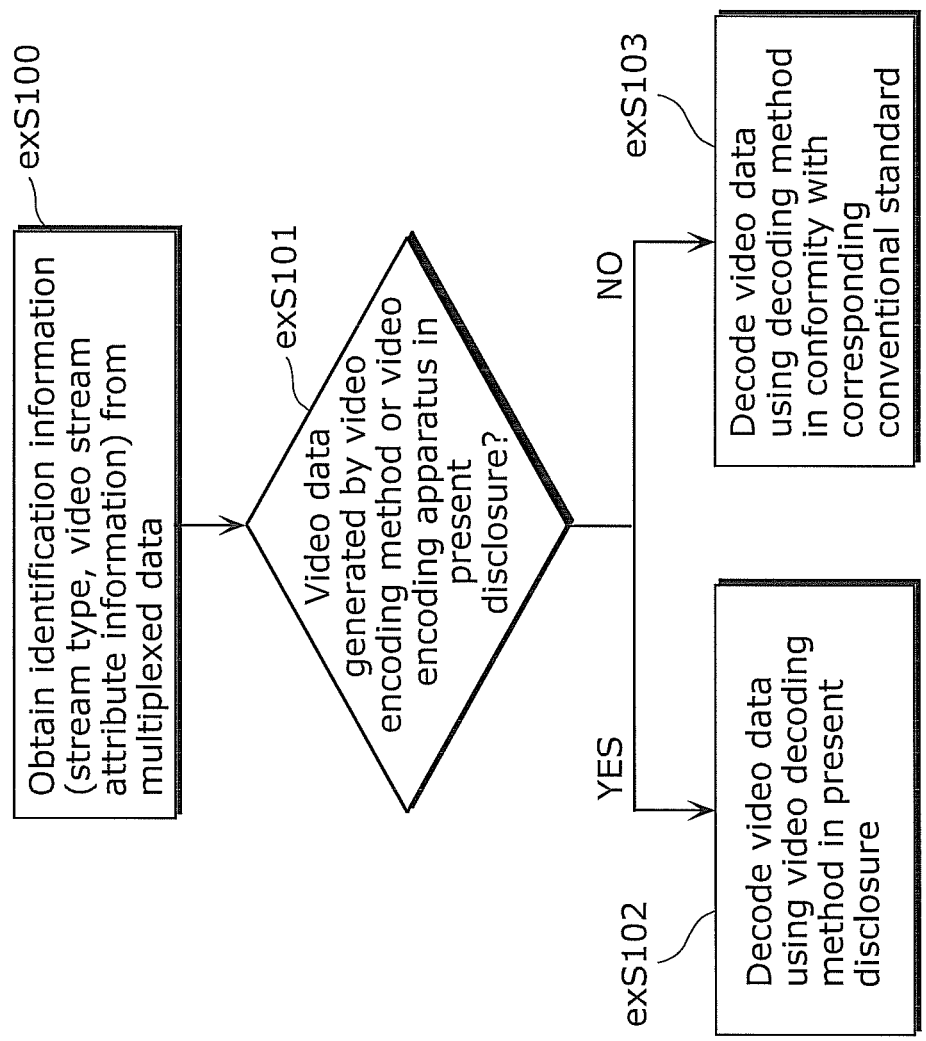
FIG. 33 shows steps for identifying video data.

Furthermore, FIG. 33 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 6

Figure 34:
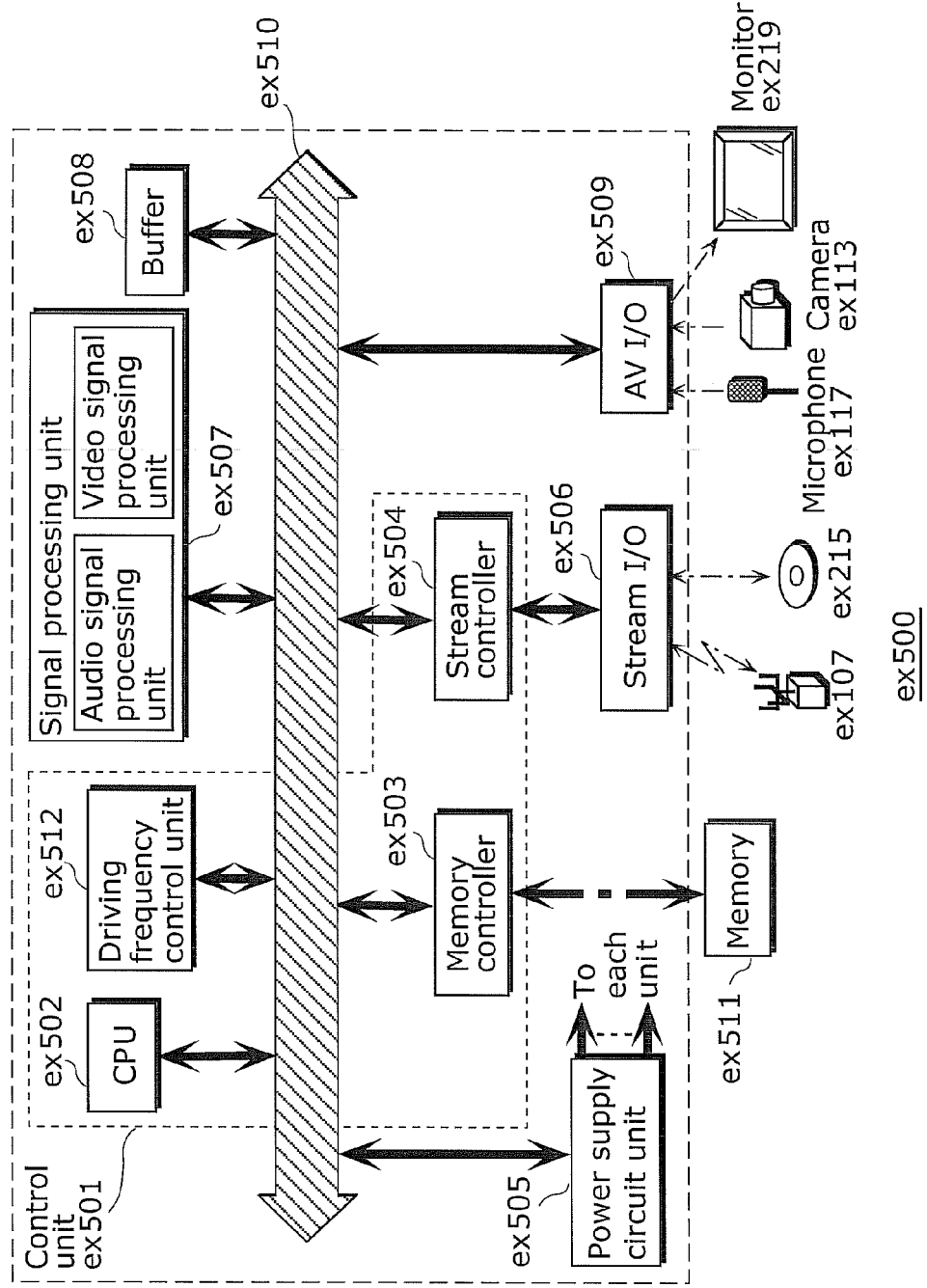
FIG. 34 shows an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 34 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 7

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, the power consumption increases.

Figure 35:
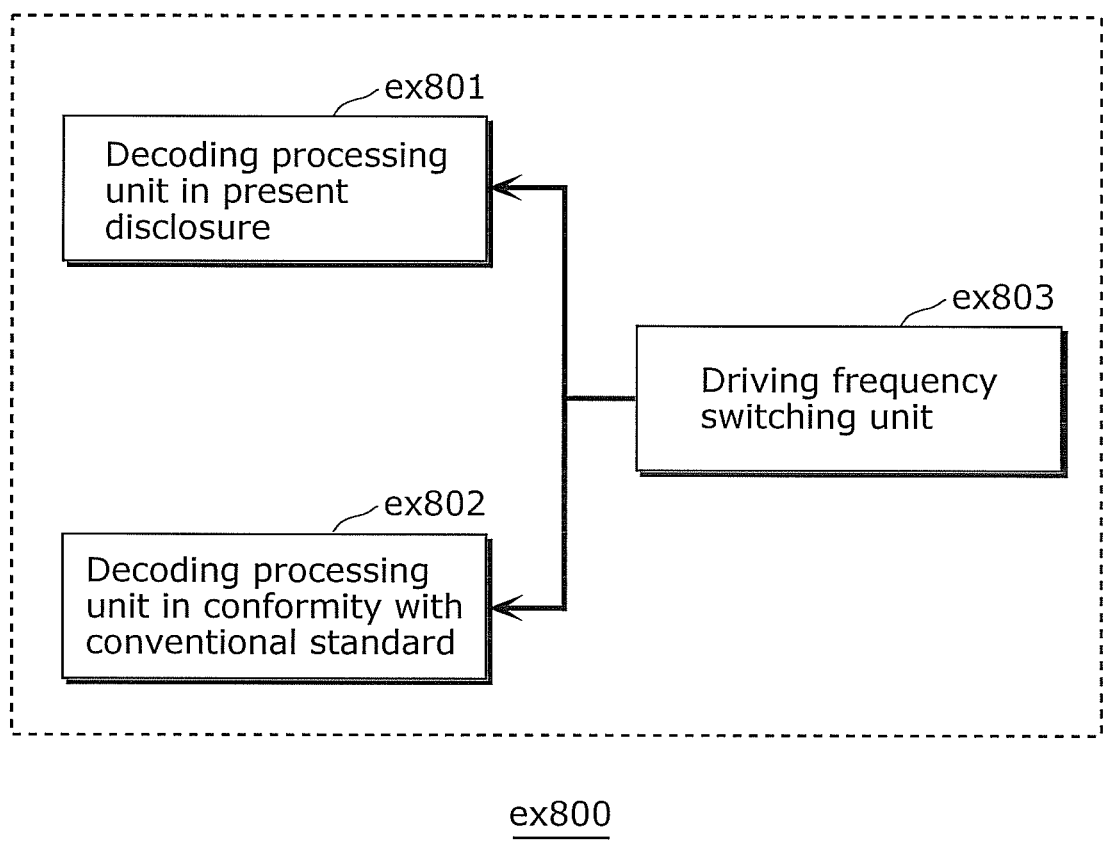
FIG. 35 shows a configuration for switching between driving frequencies.

In view of this, the moving picture decoding apparatus, such as the television ex300 and the LSI ex500 is configured to determine to which standard the video data conforms, and switch between the driving frequencies according to the determined standard. FIG. 35 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 34. Here, each of the decoding processing unit ex801 that executes the moving picture decoding method described in each of embodiments and the decoding processing unit ex802 that conforms to the conventional standard corresponds to the signal processing unit ex507 in FIG. 34. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 37. The driving frequency can be selected by storing the look-up table in the buffer ex508 and in an internal memory of an LSI, and with reference to the look-up table by the CPU ex502.

Figure 36:
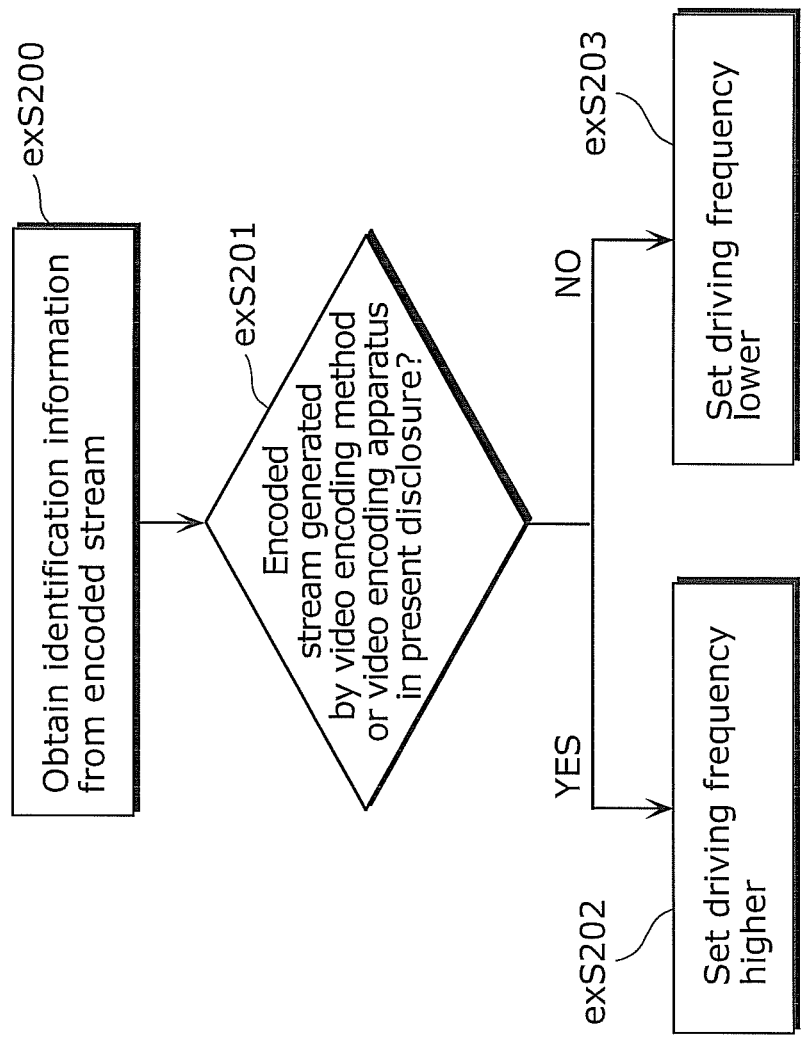
FIG. 36 shows steps for identifying video data and switching between driving frequencies.

FIG. 36 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, increase in the scale of the circuit of the LSI ex500 and increase in the cost arise with the individual use of the signal processing units ex507 that conform to the respective standards.

Figure 38A:
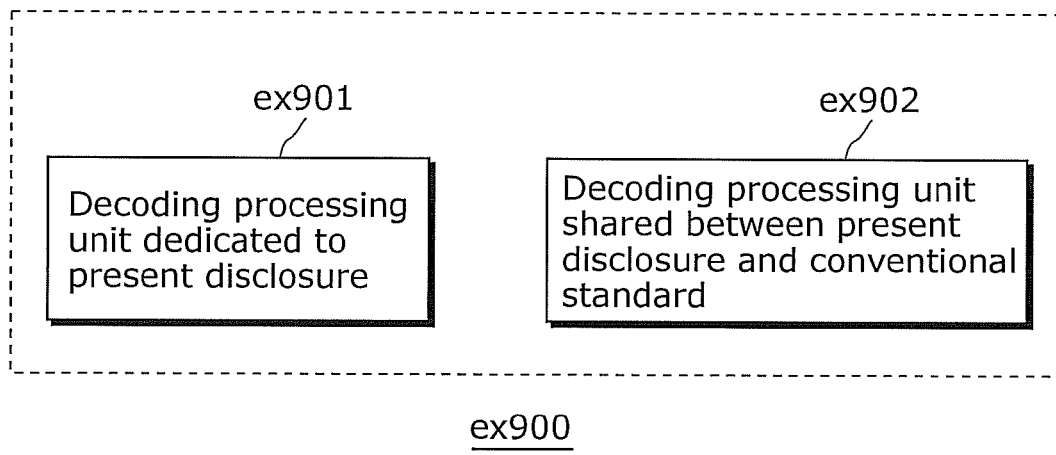
FIG. 38A is a diagram showing an example of a configuration for sharing a module of a signal processing unit.

In view of this, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 38A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. The decoding processing unit for implementing the moving picture decoding method described in each of embodiments may be shared for the processing to be shared, and a dedicated decoding processing unit may be used for processing unique to that of MPEG-4 AVC.

Figure 38B:
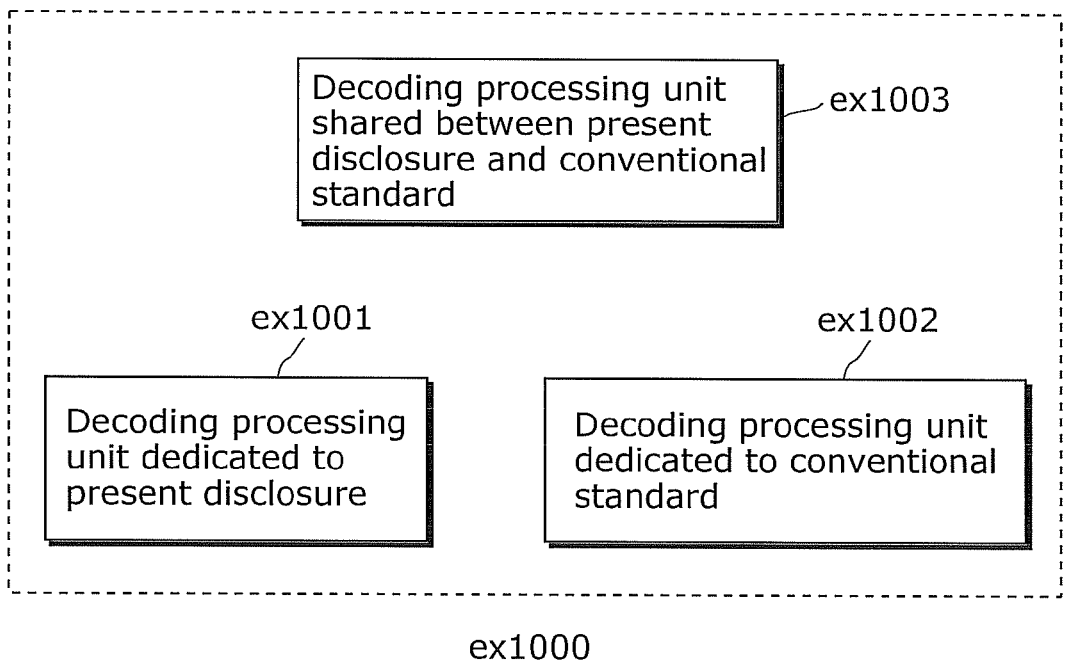
FIG. 38B is a diagram showing another example of a configuration for sharing a module of the signal processing unit.

Furthermore, ex1000 in FIG. 38B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Thus, such modifications and other embodiments are also included in the exemplary disclosure.

INDUSTRIAL APPLICABILITY

The image processing method and the image processing apparatus according to the present disclosure can be applied to an image decoding method and an image decoding apparatus. In addition, the present disclosure can be used in a high-resolution information display device or an image capturing device, such as a television set, a digital video recorder, a car navigation, a mobile phone, a digital camera, a digital video camera, and so on, which television have an image codec (encoding and/or decoding) function.

The invention claimed is:

1. An image processing method for processing an image signal generated by encoding a plurality of pictures, the image processing method comprising:
obtaining a parameter from the image signal, the parameter indicating restriction on a reference relation between at least one of the plurality of pictures and an other one of the plurality of pictures in the encoding; and
performing restriction alleviation processing for alleviating the restriction on the reference relation indicated by the parameter, wherein
the image signal includes a plurality of network abstraction layer (NAL) units as signal units, and each of pictures corresponding to a different one of the plurality of NAL units is classified into any one of a plurality of layers, and encoded without referring to a picture which belongs to a layer of a higher level than a layer to which the picture belongs,
in the performing,
a target NAL unit of the signal units is a target for the restriction alleviation processing, such that even when a first NAL unit type included in the image signal is incorrect, a second NAL unit type, included in the image signal, in which restriction on a reference relation is alleviated, is applied to the target unit of the signal units, and
in the obtaining,
a NAL unit type included in the target NAL unit to be processed, which is any one of the plurality of NAL units, is obtained as the parameter, the NAL unit type being included in a NAL unit corresponding to a target picture to be processed among the plurality of pictures, and defining forbidding a reference relation in which the target picture refers to a specific picture which belongs to a same layer as the target picture,
the image processing method further comprising: in the performing,
when the NAL unit type is the first NAL unit type, the second NAL unit type, which is not included in the target NAL unit, is applied to the target NAL unit instead of the first NAL unit type, the second NAL unit type defining alleviated restriction which is less strict than restriction on a reference relation defined by the first NAL unit type,
when the first NAL unit type defines that a picture corresponding to the target NAL unit is: a random access skipped leading (RASL) picture that (i) is a leading picture which is subsequent in decoding order to a random access point (RAP) picture that is a starting point of the random access reproduction and which precedes the RAP picture in display order and (ii) has a reference relation in which decoding is impossible when the random access reproduction is performed,
the second NAL unit type, which is not included in the target NAL unit, is applied to the target NAL unit instead of the first NAL unit type, and the picture is decoded, the second NAL unit type defining that the picture is a random access decodable leading (RADL) picture that is the leading picture and has a reference relation in which decoding is possible even when the random access reproduction is performed, and
when the picture is decoded,
reference picture information corresponding to the picture is decoded,
when a reference picture identified by the decoded reference picture information is stored in a buffer, the picture is decoded by referring to the reference picture, and
when the reference picture is not stored in the buffer, an alternative picture, which is not stored in the buffer, is separately generated, and the picture is decoded by referring to the alternative picture as the reference picture.

2. The image processing method according to claim 1, further comprising:
wherein in the performing,
when the first NAL unit type defines forbidding a reference relation in which a subsequent picture subsequent in decoding order to a broken link access (BLA) picture which is a starting point of random access reproduction and corresponds to the target NAL unit refers, as a leading picture which precedes the BLA picture in display order, to an other picture,
the second NAL unit type which defines permitting the reference relation is applied to the target NAL unit, instead of the first NAL unit type.

3. The image processing method according to claim 2, further comprising:
wherein in the performing, when the first NAL unit type defines forbidding a reference relation in which the subsequent picture refers, as the leading picture, to a picture which precedes the BLA picture in decoding order, the second NAL unit type which defines permitting the reference relation is applied to the target NAL unit, instead of the first NAL unit type.

4. The image processing method according to claim 1, further comprising:

wherein in the performing, when the first NAL unit type defines forbidding a reference relation in which a subsequent picture subsequent in decoding order to an instantaneous decoding refresh (IDR) picture which is a starting point of random access reproduction and corresponds to the target NAL unit refers, as a leading picture which precedes the IDR picture in display order, to an other picture, the second NAL unit type which defines permitting the reference relation is applied to the target NAL unit, instead of the first NAL unit type.

5. The image processing method according to claim 1, further comprising:

wherein in the performing, a NAL unit including the second NAL unit type is generated by replacing the first NAL unit type included in the target NAL unit with the second NAL unit type.

6. An image processing apparatus which processes an image signal generated by encoding a plurality of pictures, the image processing apparatus comprising:

control circuitry; and storage accessible from the circuitry, wherein the control circuitry performs, using the storage, obtaining a parameter from the image signal, the parameter indicating restriction on a reference relation between at least one of the plurality of pictures and an other one of the plurality of pictures in the encoding; and performing restriction alleviation processing for alleviating the restriction indicated by the parameter, wherein the image signal includes a plurality of network abstraction layer (NAL) units as signal units, and each of pictures corresponding to a different one of the plurality of NAL units is classified into any one of a plurality of layers, and encoded without referring to a picture which belongs to a layer of a higher level than a layer to which the picture belongs, in the performing, a target NAL unit of the signal units is a target for the restriction alleviation processing, such that even when a first NAL unit type included in the image signal is incorrect, a second NAL unit type, included in the image signal, in which restriction on a reference relation is alleviated, is applied to the target unit of the signal units, and in the obtaining, a NAL unit type included in the target NAL unit to be processed, which is any one of the plurality of NAL units, is obtained as the parameter, the NAL unit type being included in a NAL unit corresponding to a target picture to be processed among the plurality of pictures, and defining forbidding a reference relation in which the target picture refers to a specific picture which belongs to a same layer as the target picture, the image processing method further comprising: in the performing, when the NAL unit type is the first NAL unit type, the second NAL unit type, which is not included in the target NAL unit, is applied to the target NAL unit instead of the first NAL unit type, the second NAL unit type defining alleviated restriction which is less strict than restriction on a reference relation defined by the first NAL unit type, when the first NAL unit type defines that a picture corresponding to the target NAL unit is: a random access skipped leading (RASL) picture that (i) is a leading picture which is subsequent in decoding order to a random access point (RAP) picture that is a starting point of the random access reproduction and which precedes the RAP picture in display order and (ii) has a reference relation in which decoding is impossible when the random access reproduction is performed, the second NAL unit type, which is not included in the target NAL unit, is applied to the target NAL unit instead of the first NAL unit type, and the picture is decoded, the second NAL unit type defining that the picture is a random access decodable leading (RADL) picture that is the leading picture and has a reference relation in which decoding is possible even when the random access reproduction is performed, and when the picture is decoded, reference picture information corresponding to the picture is decoded, when a reference picture identified by the decoded reference picture information is stored in a buffer, the picture is decoded by referring to the reference picture, and when the reference picture is not stored in the buffer, an alternative picture, which is not stored in the buffer, is separately generated, and the picture is decoded by referring to the alternative picture as the reference picture.

7. The image processing method according to claim 1, wherein the alternative picture is a gray image having zero chromaticity.

* * * * *